US012634129B2

(12) United States Patent
Wang et al.

(10) Patent No.: US 12,634,129 B2
(45) Date of Patent: May 19, 2026

(54) MULTIMODE HETEROGENEOUS IoT NETWORKS

(71) Applicant: Innovation Sciences, LLC, Plano, TX (US)

(72) Inventors: Tiejun Wang, Alexandria, VA (US); Tiehong Wang, Plano, TX (US)

(73) Assignee: Innovation Sciences, LLC, Plano, TX (US)

( * ) Notice: Subject to any disclaimer, the term of this patent is extended or adjusted under 35 U.S.C. 154(b) by 0 days.

(21) Appl. No.: 19/240,018

(22) Filed: Jun. 17, 2025

(65) Prior Publication Data

US 2026/0005854 A1     Jan. 1, 2026

Related U.S. Application Data

(63) Continuation of application No. 18/106,497, filed on Feb. 7, 2023, now Pat. No. 12,348,632, which is a
(Continued)

(51) Int. Cl.
*H04L 9/08* (2006.01)
*G06T 19/00* (2011.01)
(Continued)

(52) U.S. Cl.
CPC .......... *H04L 9/0894* (2013.01); *H04L 9/0643* (2013.01); *H04L 9/0866* (2013.01); *H04L 9/0869* (2013.01); *H04L 41/0823* (2013.01); *H04L 41/0893* (2013.01); *H04L 41/0895* (2022.05); *H04L 45/128* (2013.01);
(Continued)

(58) Field of Classification Search
CPC ... H04L 9/0894; H04L 9/0643; H04L 9/0866; H04L 9/0869; H04L 41/0823; H04L 41/0893; H04L 41/0895; H04L 45/128; H04L 45/24; H04L 67/12; H04L 67/288; H04L 67/563; H04L 41/0894; H04L 9/50; H04L 67/56; H04L 12/4625; H04L 63/123; H04L 63/126; H04L 67/34; H04L 2209/805; H04L 9/3239; G06T 19/00; H04W 4/38; H04W 4/80; H04W 4/70; H04W 12/03; H04W 12/041; H04W 24/02; H04W 84/18
See application file for complete search history.

(56) References Cited

U.S. PATENT DOCUMENTS 10,129,227 B2 * 11/2018 Ahuja ................. H04L 63/0428
12,348,632 B2 * 7/2025 Wang ................. H04L 41/0823
(Continued)

FOREIGN PATENT DOCUMENTS

CN          1438769          8/2003
CN          1445678          10/2003
(Continued)

OTHER PUBLICATIONS

PCT International Search Report of International Application No. PCT/CN2022/116928 mailed Jan. 18, 2023.
(Continued)

*Primary Examiner* — Brandon J Miller
(74) *Attorney, Agent, or Firm* — Dentons US LLP

(57) ABSTRACT

A novel IoT network, methods of making, structure and functions, and method of use are disclosed.

16 Claims, 11 Drawing Sheets

Related U.S. Application Data continuation of application No. 16/605,191, filed on Oct. 14, 2019, now abandoned.

(51) Int. Cl.

| | | |
|---|---|---|
| *H04L 9/06* | (2006.01) |
| *H04L 41/0823* | (2022.01) |
| *H04L 41/0893* | (2022.01) |
| *H04L 41/0894* | (2022.01) |
| *H04L 41/0895* | (2022.01) |
| *H04L 45/128* | (2022.01) |
| *H04L 45/24* | (2022.01) |
| *H04L 67/12* | (2022.01) |
| *H04L 67/288* | (2022.01) |
| *H04L 67/563* | (2022.01) |

(52) U.S. Cl.

CPC .............. *H04L 45/24* (2013.01); *H04L 67/12* (2013.01); *H04L 67/288* (2013.01); *H04L 67/563* (2022.05); *G06T 19/00* (2013.01); *H04L 41/0894* (2022.05)

(56) References Cited

U.S. PATENT DOCUMENTS

| | | | |
|---|---|---|---|
| 2002/0103855 A1 | 8/2002 | Chatani | |
| 2005/0033250 A1 | 2/2005 | Collette | |
| 2005/0046578 A1 | 3/2005 | Pires | |
| 2009/0303042 A1* | 12/2009 | Song ................... | G08B 25/009 |
| | | | 340/541 |
| 2016/0205007 A1* | 7/2016 | Syed ................... | H04L 43/062 |
| | | | 709/224 |
| 2017/0238129 A1* | 8/2017 | Maier ................... | H04W 4/14 |
| | | | 455/404.2 |
| 2017/0302478 A1 | 10/2017 | Al-Gharaibeh et al. | |
| 2018/0006888 A1 | 1/2018 | Vaughn et al. | |
| 2018/0198641 A1* | 7/2018 | Gilani ................... | G08B 25/004 |
| 2019/0007286 A1* | 1/2019 | Klemetsson .......... | H04W 24/08 |
| 2019/0063746 A1 | 2/2019 | Lam | |
| 2019/0392328 A1 | 12/2019 | Gil Bulacio et al. | |
| 2020/0145493 A1 | 5/2020 | Wang | |
| 2020/0241482 A1* | 7/2020 | Sinha ................... | G05B 13/027 |
| 2021/0319894 A1 | 10/2021 | Sobol et al. | |

FOREIGN PATENT DOCUMENTS

| | | |
|---|---|---|
| CN | 1508703 | 6/2004 |
| CN | 102036371 | 4/2011 |
| CN | 102129233 | 7/2011 |
| CN | 102185745 | 9/2011 |
| CN | 202472841 | 10/2012 |
| CN | 103593943 | 2/2014 |
| CN | 103873520 | 6/2014 |
| CN | 104899720 | 9/2015 |
| CN | 204733413 | 10/2015 |
| CN | 105353672 | 2/2016 |
| CN | 105610944 | 5/2016 |
| CN | 105956981 | 9/2016 |
| CN | 106291644 | 1/2017 |
| CN | 106297161 | 1/2017 |
| CN | 106370571 | 2/2017 |
| CN | 106453405 | 2/2017 |
| CN | 106981166 | 7/2017 |
| CN | 107328695 | 11/2017 |
| CN | 107356289 | 11/2017 |
| CN | 206848800 | 1/2018 |
| CN | 207253620 | 4/2018 |
| CN | 108154669 | 6/2018 |
| CN | 108525186 | 9/2018 |
| CN | 108597599 | 9/2018 |
| CN | 108921471 | 11/2018 |
| CN | 208366786 | 1/2019 |
| CN | 109862011 | 6/2019 |
| CN | 109887221 | 6/2019 |
| CN | 110553801 | 12/2019 |
| CN | 110619385 | 12/2019 |
| CN | 209913811 | 1/2020 |
| CN | 210181754 | 3/2020 |
| CN | 111047818 | 4/2020 |
| CN | 111091322 | 5/2020 |
| CN | 111179279 | 5/2020 |
| CN | 111225375 | 6/2020 |
| CN | 111510500 | 8/2020 |
| CN | 111586569 | 8/2020 |
| CN | 211602818 | 9/2020 |
| CN | 111812181 | 10/2020 |
| CN | 212206371 | 12/2020 |
| CN | 112269199 | 1/2021 |
| CN | 212275590 | 1/2021 |
| CN | 112346717 | 2/2021 |
| CN | 112532413 | 3/2021 |
| CN | 113011570 | 6/2021 |
| CN | 213817912 | 7/2021 |
| CN | 113269034 | 8/2021 |
| CN | 214081465 | 8/2021 |
| CN | 113360133 | 9/2021 |
| CN | 214125231 | 9/2021 |
| CN | 113727317 | 11/2021 |
| CN | 113835842 | 12/2021 |
| CN | 113903163 | 1/2022 |
| CN | 215812285 | 2/2022 |
| CN | 114169446 | 3/2022 |
| CN | 114189856 | 3/2022 |
| CN | 114323023 | 4/2022 |
| CN | 216283944 | 4/2022 |
| CN | 114486093 | 5/2022 |
| CN | 114501430 | 5/2022 |
| CN | 114660627 | 6/2022 |
| CN | 114885286 | 8/2022 |
| CN | 117270825 | 12/2023 |
| JP | 2002031571 | 1/2002 |
| JP | 2005000602 | 1/2005 |
| KR | 20210123648 | 10/2021 |
| TW | I553567 | 10/2016 |
| WO | 2000026882 | 5/2000 |
| WO | 2004098401 | 11/2004 |
| WO | 2013083823 | 6/2013 |
| WO | 2017053449 | 3/2017 |
| WO | 2021088479 | 5/2021 |
| WO | 2021101032 | 5/2021 |

OTHER PUBLICATIONS

PCT International Search Report of International Application No. PCT/CN2023/143593 mailed Mar. 28, 2024.

\* cited by examiner

700

740

730

720

710

Cloud Controller

Multi-mode HetNet Node

Multi-mode HetNet Node

730

720

Multi-mode HetNet Node

Multi-mode HetNet Node

Multi-mode HetNet Node

End Terminal Device Agent          Network Edge Agent

MULTIMODE HETEROGENEOUS IoT NETWORKS

1. CROSS REFERENCE TO RELATED APPLICATIONS

This application is a continuation of Ser. No. 18/106,497 filed on Feb. 7, 2023, which is a continuation of Ser. No. 16/605,191 filed on Jul. 22, 2019.

The disclosure of U.S. Pat. No. 17,385,223, titled "Method and System for Efficient Communication," which names Tiejun Wang and Tiehong Wang as inventors, is hereby incorporated herein by reference.

2. DEFINITIONS

Sensor—A device which provides an output that varies with a physical property.

Sensitivity—How much a sensor's output changes with a change of the physical property.

Sampling rate—Number of sensor sample values for a physical property in a given period of time.

Random error—Differences in repeated measurements of an presumably constant value for a physical quantity.

Precision—Statistical variability of repeated measurements of a value of a physical property. Precision is limited by random error.

Systematic error—An error having a nonzero mean, so that its effect is not reduced when multiple observations are averaged.

Resolution—Number of discrete values that can be represented for a defined range of values. Resolution is determined by the number of bits used for representing values in the defined range.

Analog representation—Representing information using continuous values.

Analog data—Continuous values.

Analog value—A value of information represented as analog data.

Digital representation—Representing information using discrete values.

Digital data—Discrete values.

Digital value—A value for information represented as digital data.

Bit—A value that has one of two values, zero or one.

Binary—A base 2 numbering system using bits.

Binary sequence—A sequence of bits.

Binary representation—Representing information in binary.

Binary data—Discrete values represented in binary.

Binary value—A value for information represented as binary data.

Computer—A machine or device that performs processes, calculations, and operations based on instructions provided by a software or hardware program.

Computer system—A set of computers that share (can communicate with, store data on, and read data from) the same data storage.

Telecommunication_Transmission of signs, signals, messages, words, writings, images, sounds or information of any nature by wire, radio, optical or other electromagnetic systems.

Link—A communication channel that connects two or more devices.

Network node—An active electronic device that is capable of receiving and transmitting information over a communications channel to at least one other node of the network.

Node—A network node.

MAC—Media Access Controller.

Frame—A binary sequence comprising source and destination device MAC addresses, and a message. A message of a frame is also referred to as a payload.

Packet—A binary sequence comprising source and destination addresses, and a message. A message of a packet is also referred to as a payload.

Data transmit unit—A packet or frame.

Ad hoc network—A network in which determination of which nodes forward data is made dynamically on the basis of network connectivity data and at least one routing algorithm.

Packet Switched network—(PSN) A network in which packets are routed through a network based on the address information contained within each packet.

Wide Area Network—(WAN) a geographically distributed network in which nodes of the network extend beyond a one kilometer radius.

Local Area Network—(LAN) Geographically localized network in which nodes of the network are generally within one hundred meters of one another and share a common communications line or wireless link.

Cellular network—A network where the last link is wireless.

Mobile network—Another name for a cellular network.

1G, 2G, 3G, 4G, and 5G are acronyms for "first generation" through "fifth generation"

1G, 2G, 3G, 4G, and 5G also refer to sets of standards used for mobile devices and mobile telecommunications use services and networks.

WiFi—The IEEE 802.11x specification for defining communication over a wireless LAN.

Internet of Things (IoT)—Extension of Internet connectivity to physical devices and sensors.

Wireless sensor network—(WSN) A group of spatially dispersed nodes in which each node is connected to one or more sensors for monitoring and recording the physical conditions of the environment and transmitting the collected data via other nodes of the network to a central location. Typically, a WSN is an ad hoc network.

Communication parameters—Bandwidth, data rate, latency, transmitted power, size of data package, data package structure, modulation scheme, coding scheme, receiving sensitivity, nodes of network, and node structure.

Network topology—Description of the links between nodes, which include the bus, ring, star, mesh, tree, and hybrid topologies.

Network structure—Network nodes, node addresses, node object code, data lookup tables, such as routing tables, packet priorities, routing priorities, and path priorities, and topology.

Data rate—The rate at which data is transmitted from one node to another.

Bandwidth—The maximum data rate at which data is transmitted from one node to another.

Latency—The amount of time for a message transmitted from a source to reach its destination.

Traffic shaping—Regulating network packets in a PSN.

Quality Of Service (QOS)—And technology on a PSN that manages data traffic to reduce packet loss, latency, and/or jitter.

BPSK—An acronym meaning Binary Phase Shift Keying

QPSK—An acronym meaning Quadrature Phase Shift Keying

Edge computing—Processing data in a network near where sensor data is generated instead of at a centralized data—processing warehouse.

Edge device—A device which provides an entry point into networks, such as routers and digital switches.

Fog computing—Using edge devices to process data and transmit results of processing to the network.

Software Defined Radio—(SDR) is a radio communication system where components that have been traditionally implemented in hardware (e.g. mixers, filters, amplifiers, modulators/demodulators, detectors, etc.) are instead implemented by means of software on a computer or embedded system.

TCP/IP—An acronym for transmission control protocol/Internet protocol, which is a specification defining connection of computer systems to the Internet.

UDP—An acronym for User Datagram Protocol.

Base radio station—A transceiver connecting a number of other devices to one another or to a network.

Analog to digital converter (ADC)—An electronic circuit that converts an analog value to a digital representation of that value.

Cloud center—A logical cluster of computers that share resources and are available for cloud computer.

Cloud computing—The on demand availability of computer system resources, especially data storage and computing power, without direct active management by the user.

ID—Identification.

Preferably—Preferably herein means a feature that can be included.

and/or—This phrase means the alternatives for requiring both and requiring only one or the other.

Hash function, also called a one-way hash function—A function whose input is any digital value and whose output is a value which, when represented in binary, always has the same number of bits. The same number of bits represent any output of a hash function, regardless of the digital value input to the hash function.

A hash—A digital value output from a hash function resulting from applying the hash function to a digital value input to the hash function. A hash is conventionally represented in binary as a binary sequence.

Message authentication—Confirming a message comes from a source device indicated in the message, or optionally from also from the source devices's location and time indicated in the message.

Network packet—A formatted unit of data carried by a packet-switched network, consisting of packet control data and packet payload.

Packet control data—Data providing information for delivering the payload, such as source and destination network addresses, error detection codes, and sequencing information. Typically, control information is found in packet headers and trailers.

Packet payload—Data contained in a packet representing information to be transmitted, also referred to as a message.

Packet header—Binary values at the beginning or front of a packet that precedes the payload and contain packet control data.

Packet header—Binary values at that follow after or behind the packet payload that contain packet control data, such as an end-of-packet identifier, and a packet checksum value.

GPS—Global Positioning System

Seed—A number or vector input to a pseudo random number generator function.

Salt—One of two values stored in memory in association with one another, in which the other value is a hash of a concatenation the salt and a value comprising an identifier (such as a password).

AES (Advanced Encryption Standard)—A symmetric block cipher.

RSA (Rivest-Shamir-Adleman)—A public-key cryptosystem.

Multicast—Transmission from one sender to many recipients.

IP multicast—A network protocol in which certain nodes store "join" and "leave" messages for particularly designated frames or packets, and those certain nodes retransmit for particularly designated frames or packets to nodes from which they received a join message and have not received a leave message.

VR—An acronym for "Virtual Reality."

USP—An acronym for United States patent.

MC System—A partial acronym for Management Center System.

CHS—An acronym for Centralized Hub System.

ATM—An acronym for Automated Teller Machine.

PDA—An acronym for Personal Digital Assistant.

PC—An acronym for Personal Computer.

PSTN—An acronym for Public Switched Telephone Network.

NFC—An acronym for Near Field Communication.

DSL—An acronym for Digital Subscriber Line.

HetNet—A pseudo acronym for Heterogeneous Network.

WCDMA—An acronym for Wideband Code Division Multiple Access.

PCIe—An acronym for Peripheral Component Interconnect Express.

MQTT—An acronym for Message Queuing Telemetry Transport.

RPC—An acronym for Remote Procedure Call.

HTTP—An acronym for HyperText Transfer Protocol.

gRPC—An open source RPC that uses HTTP/2 (an updated revision to HTTP) for Protocol Buffers as the interface description language.

3. DESCRIPTION OF THE BACKGROUND

Different types of networks provide different values for data rate and latency. Networks using power cables as communication lines have relatively low bandwidth and relatively low latency. WiFi networks have relatively high bandwidth and relatively low latency. Many cellular networks use 2G, 3G, and 4G, and will use 5G. Cellular networks have intermediate bandwidth and relatively high latency.

Sensors transduce values of physical properties and normally provide transduced values that are time dependent analog signals. These time dependent analog signals are normally converted to sequential digital values representing the values of the physical property measured by the sensor's transducer, using a circuit including an ADC operating at a sampling rate. Common types of sensors include: temperature, proximity, pressure, water quality, chemical, gas, smoke, infra red, level (of a liquid), image, motion, acceleration, gyroscopic, humidity, and optical.

4. SUMMARY OF THE DISCLOSURE 4.1 Novel IoT Networks and Methods of Making, Configuring, and Using them Novel IoT networks and methods of making, configuring, and using them are disclosed herein.

In some embodiments, novel IoT networks can be dynamically configured. The dynamic configuration, for example, may be performed by one or more of hardware, firmware, and/or software resident in the network. The dynamic configuration may for example adjust network structure and communication parameters. The dynamic adjustment may for example be in response to correlation of values for physical properties received by sensors of the network. The values of the physical properties are one form of sensor data. This sensor data is generate by sensors at spatially diverse geographic locations and typically provides measurements of physical properties at those locations.

In some examples, dynamically configuring the IoT network may include moving processing functions and tasks between network nodes, Fog devices, and Edge devices. Dynamically configuring may include changing processing functions and tasks being performed by the novel IoT network.

In some examples, dynamically configuring the IoT network may be a response of the network to sensor data. Dynamically configuring may comprising, making and breaking links between network nodes. Dynamically configuring may comprising, changing routing priority associated with different types of data.

The novel IoT network functions to preferably adjust network structure and communication parameters by applying an algorithm to data, including the sensor data from plural sensors. The sensor data used by the algorithm may include sensor data obtained over a period of time. The sensor data may include sensor data obtained from sensors located at geographically disparate locations. The sensor data may include sensor data transmitted from sensors to different nodes of network. Each node of the network that communicates with a sensor, may communicate with plural sensors. However, each sensor typically communicates with only one node of the network.

The algorithm may determine the first and second time derivatives of the sensor data from any one or more or all of the sensors. The algorithm may determine the first derivative of the sensor data, and the second derivative of the sensor data.

The algorithm may respond to the sensor data, the first derivative of the sensor data, and the second derivative of the sensor data, by dynamically prioritizing communications to and from sensors having values outside a relatively normal range, from sensors providing values that have relatively large first time derivatives, and from sensors providing values having relatively large second time derivatives.

The algorithm may model the spatial progression of variation in values of sensor data, variation in first time derivatives, and variation in second time derivatives. From this modeling, the algorithm may predict spatial and temporal changes in environmental properties corresponding to the sensor data.

The algorithm may use the results of the model to predict sensors in locations expected to experience abnormal sensor values, and large first and/or second time derivatives of sensor data.

The algorithm may respond to the predictions by dynamically prioritizing communications to and from sensors predict to be in locations that will have abnormal values, and large first and/or second time derivatives of sensor data.

Dynamically prioritizing communications to certain sensors comprises one or more of changing network structure and communication parameters.

For example, dynamically prioritizing communications to and from a particular sensor may comprise instructing a first node that receives communications directly from a sensor to increase transmission power and/or wirelessly link to a more network node further away from the node to which the first node previously linked.

For example, dynamically prioritizing communications to and from a particular sensor may comprise instructing a first node that receives communications directly from a sensor to increase transmission frequency, to more frequently provide data from the sensor to a destination.

For example, dynamically prioritizing communications to and from a particular sensor may comprise instructing a first node that receives communications directly from a sensor to switch modulation from BPSK to QPSK to increase data transmission rate.

For example, dynamically prioritizing communications to and from a particular sensor may comprise instructing control electronics controlling the sensor to increase the sensors sampling rate and/or resolution.

For example, dynamically prioritizing communications to and from a particular sensor may comprise traffic shaping and QOS of packets originating from that particular sensor. One mechanism to provide for traffic shaping and QOS of packets is to include a sensor ID, or geographic region ID, in packet control data fields in the header of the packets. One or more nodes in the network may inspect packet headers to determine a sensor ID, or geographic region ID. That node may determine whether to promptly forward the inspected packet depending upon comparison of sensor ID, or geographic region ID, to values or ranges that node stores in memory associated with high priority. That node may also determine to buffer, that is delay, transmission of packets whose a sensor ID, or geographic region ID do not match values or ranges that node stores in memory associated with high priority.

The algorithm may respond to the sensor data, the first derivative of the sensor data, and the second derivative of the sensor data, by dynamically adjusting communication parameters, bandwidth, data rate, latency, transmitted power, size of data package, data package structure, modulation scheme, coding scheme, receiving sensitivity, and nodes of network and network structure.

The novel IoT network preferably includes algorithms that can adjust the foregoing parameters based upon IoT network requirements. These requirements may vary depending upon the goal of the entities using the network, or by industry.

One example is an IoT network containing sensors designed to determine if fire is present. The IoT sensors may sensors that monitor temperature, humidity, atmospheric gas content, and smoke. Fires evolve rapidly. It is therefore desirable to provide sensors in the vicinity of a fire with higher data rates, sampling times, and lower latency. The foregoing algorithm may function to identify fires by correlating data from sensor to sensor location. Upon identifying a fire, the algorithm may respond by increasing the responsiveness of sensors at the location of the fire and in locations predicted by the algorithm's predictive modeling to soon be in the fire. Consequently, the network and provide more responsive time feedback on the fire to personnel. Consequently, the network and provide more responsive time feedback on the fire to automated response equipment designed to respond to a fire.

The software that carries out the dynamic adjustment for the IoT network may be centralized in one component or spread among multiple components of the network.

In one example, a CHS includes the hardware, software or firmware to carry out at least some and optionally all of the dynamic configuration.

In another example, an MC System includes the hardware, software or firmware to carry out at least some and optionally all of the dynamic configuration.

In conjunction with providing the dynamically configurable IoT network, one or more embodiments of the invention provide efficient integration for Internet, wireless networks, cable, DSL, satellite, and TV communications to enable communications among potentially different user terminals. The user terminals include home and office appliances (such as TV, computer) and wireless terminals (such as mobile phone, PDA). In a system configured according to this aspect, an MC System receives, selects, converts, compresses, decompresses, and routs data to the user terminals. Various examples are presented and will be apparent to the ordinarily skilled artisan once instructed according to the teachings of this aspect. By way of example, signals such as those from a fire alarm or theft sensor are sent through the MC System to a user's cell phone and/or 911 Center. The corresponding sensor data from these sensors is also used to carry out the dynamic configuration of the IoT network. In this aspect, some processing functions may be performed by the MC System in combination with other components, such as a user terminal, other MC Systems, the CHS, etc.

4.2 MDTU (Multimode Data Transmit Unit)

A multimode data transmit unit (MDTU) is an IoT network node that receives sensor data directly from one or more sensors, and transmits at least some of that sensor data to other nodes of the network. An MDTU preferably is capable of receiving data from different sensors transmitted to it using different transmission modes and protocols. The novel IoT network comprises at least one and preferably a large number of MDTUs.

An MDTU comprises a digital computer which comprises a CPU, digital memory, a data bus, data communication lines and/or wireless transceiver, digital memory, and software and data resident in the memory. The resident software comprises an operating system controlling interaction of the CPU and other physical components of the MDTU enabling the CPU to read and write data to and from the memory, to send control signals circuitry controlling the data communication lines and/or transceiver to communication settings between the MDTU and other devices, and to send and receive data using the data communication lines and/or transceiver. The resident software configures the MDTU to apply the hash function to certain data and to encrypt certain data for transmission to other nodes, and preferably also to integrated sensors, and to authenticate and decrypt certain data received from other nodes and preferably integrated sensors. The MDTU's hardware may include static memory in addition to read writable memory.

The static memory and/or read writable memory preferably stores at least one hash function and at least one encryption algorithm for use in hashing and encrypting data for transmission.

Preferably, the resident software and/or hardware implement a clock function. The clock function preferably stores at least one time value in the memory. The software preferably is configured to read this memory to retrieve at least one time value stored in memory by the clock function. The software preferably comprises a clock calibration routine that reads a value contained in a time signal transmitted to the MDTU. The clock calibration routine preferably resets the MDTU's clock function to provide the same time value as other nodes of the network. The resident software may also configure the MDTU to receive a network value broadcast and/or IP multicast within the network to the MDTU, store that value in memory, and use that value instead of or in addition to a time value, as an input to a hash function.

An MDTU preferably comprises a transceiver. The transceiver may comprises an antenna, a mixer, and an ADC and a DAC. The transceiver may comprise software defined radio elements including one or more of mixers, filters, amplifiers, modulators/demodulators, implemented by software, and active electronics antenna configurations controlled by software.

Preferably, the MDTU comprises software for instructing integrated sensors to use specified transmission and reception frequencies or frequency bands, data rates, transmitted power, size of data package, data package structure, modulation scheme, information coding scheme, and receiver sensitivity, and integrated sensor configurable antenna configurations. That is, MDTU preferably comprise software for controlling integrated sensor communication parameters.

Preferably, the MDTU receives messages from an integrated sensor in the form of data transmit units.

An MDTU is designed to be capable of communicating with multiple sensors, either wirelessly or via wired connections. For example, using RS-232 or IEEE-485 communication specifications. In one embodiment, each MDTU communicates with 11 different sensors. Some or all of the sensors may be embedded in the MDTU as integrated elements in a common mechanical structure.

An MDTU transmits sensor data to one or more other nodes of the network. An MDTU may process sensor data and then transmit to another node the results of processing. The MDTU may change encoding of sensor data and transmit to another node the sensor data in the newly encoded format. An MDTU may receive data from different sensors encoded in different specifications, and convert the data from the sensors to a common encoding specification. The MDTU may use the data from the sensors encoded in the common specification to form data transmit units containing that data for transmission to other nodes of the network.

For example, and MDTU may convert analog voltage representing temperature, to a digital value representing temperature in Kelvin, and then encode in some specification both the digital value and an indicator that the digital value represents temperature in Kelvin, as a binary sequence, and then form one or more data transmit units containing the binary sequence. The data transmit units may be packets confirming to TCP/IP.

Preferably, an MDTU has sufficient digital calculation capability so that it can be configured to provide significant EDGE computing capabilities.

An MDTU may also provide the functions of an MC System as described in U.S. Pat. No. 9,912,983. The MDTU may link to a centralized hub as described for an MC System in U.S. Pat. No. 9,912,983. The MDTU may link directly or indirectly to nodes or gateways of various networks, including the Internet, cellular networks, PSTNs, and various service provider networks, as described for an MC System in U.S. Pat. No. 9,912,983.

An MDTU may also provide the functions of a centralized HUB system (CHS) as described in U.S. Pat. No. 9,912,983, and may link to an MC system, as described for a CHS in U.S. Pat. No. 9,912,983. An MDTU may link to more than one node of the IoT network. An MC system, as described in U.S. Pat. No. 9,912,983, may be a node of the IoT network.

4.3 Uses of IoT Network

Sensors of the novel IoT network may be associated with an integrated wireless transmitter, and wirelessly communicate pursuant to a specification for communicating data to an MDTU. Sensors of the novel IoT network may, alternatively, be physically integrated into an MDTU, in which case the MDTU receives the signal from the sensory typically by a conductive connection. Sensors of the novel IoT network may, also, be physically external to an MDTU, but have a data link to the MDTU via a conductive connection. In any case, sensors of the novel IoT network can provide their sensor output to an MDTU.

One or more of the MDTUs may implement software to correlate sensor data and determine a response to that data. Each MDTU may correlate data from the sensors it directly communicates with and sensors it does not directly communicate with to determine a response to that data. A cloud center may implement software to correlate sensor data and determine a response to that data. Which, if any, of MDTUs and cloud centers perform the correlation function and determines a response to that data may be determined dynamically as explained herein above.

Different IoT network configurations may be preferable for different purposes or for use by different industries, such as fire control; audio service; and home heating and air conditioning, theft prevention, and child/day care.

A novel IoT network feature is that an edge computer, such as an MDTU, is programmed to respond to time correlation of values from plural sensors at one location, and/or from plural sensors at plural locations. A response may be generation of a communication signal including determining an address for the communication. A response may be generating a process control signal to control a process. For example, a process may be closing automatically controllable fire doors, send an elevator to a floor of a building, opening a valve along a pipeline, alerting a designated set of recipients according to their stored information. The response may be coordinated and executed using information stored in a mapping table of an MC System.

An example of a time correlation is a correlation of plural seismographs miles apart indicating direction and magnitude of propagation of a seismic disturbance (earthquake). A time correlation between different kinds of sensors may be an increase in temperature and detection of smoke, both at one location.

The novel IoT network includes data associated with sensors, which includes sensor ID and sensor location. Preferably, all sensors forming part of the novel IoT network are associated with both a unique sensor ID and location of that sensor. Preferably, each sensor of the novel IoT network is associated with memory that stores a sensor ID and sensor location. That memory may be integrated with the sensor or integrated with the MDTU. This information may be communicated to and stored in a mapping table of an MC System.

The novel IoT network includes data associated with MDTU's, which includes MDTU network ID and preferably MDTU location.

Preferably, the novel IoT network comprises software designed to instruct sensors having memory storing their sensor ID and location to change their sensor ID and specify the sensor's location. For example, as the novel IoT network grows due to addition of or replacement of MDTU's and sensors, ID conflicts may arise, and need to be resolved by reassigning IDs. As elements of the novel IOD network move from point to point, their change in location needs to be updated so that the memory of the novel IOD network can maintain an accurate spatial configuration of all sensors and MDTU's of the network.

Preferably, the novel IoT network comprises software designed to reconfigure the network to reassign wireless sensors from one MDTU to another. For example, the software may determine that addition of a new MDTU to the network results in that new MDTU having a better wireless connection to a particular wireless sensor. The software may in that case instruct the old MDTU with which the sensor previously communicated, to instruct the wireless sensor to conduct communications with the new MDTU. The novel IoT network software may perform this determination of which MDTU a wireless sensor communicates with based only upon the distance between MDTUs and wireless sensors. However, the novel IoT network may also base this determination upon either of both of (1) modeling and (2) testing of signal attenuation between MDTUs and wireless sensors (such as signal strength attenuation between signals sent from or to one particular MDTU and to or from a corresponding particular wireless sensor.)

Preferably, the novel IoT network memory stores data for all MDTUs that are wireless capable, and all wireless sensors, which data includes frequencies over which those wireless capable MDTUs and wireless sensors are capable of wireless transmission.

Preferably, the novel IoT network stores data defining shapes and locations of solid, liquid, and gaseous objects in the geographic regions where the novel IoT network's wireless devices are located. Preferably, the novel IoT network stores electromagnetic wave transmission modeling software to model the propagation and attenuation of wireless transmission between wireless sensors and wireless capable MDTUs of the network, to estimate link attenuation between pairs of wireless devices, including between a wireless sensor and MDTUs, and between pairs of MDTUs.

Preferably, the novel IoT network software is designed to select links for wireless sensors to MDTU's that take into account the number of other sensors linked to each MDTU and the signal attenuation from that wireless sensor to that MDTU. For example, if an MDTU has a limit of 10 sensors it can communicate with, then an eleventh sensor would not be linked to that MDTU, even if that the link to that MDTU provided the lowest attenuation of a wireless signal sent from that sensor to any MDTU.

Preferably, the novel IoT network software is designed to actually test received signal strength of various links between wireless MDTUs, and between a wireless sensor and various MDTU's using frequency bands over which the MDTUs and wireless sensors are capable to determine links that provide the greatest received signal strength or lowest attenuation, and also the greatest signal to noise.

Preferably, the novel IoT network software is designed to test interference of a link by wireless transmission from MDTUs and wireless sensors that are not part of that link. Preferably, the novel IoT network software is designed to perform this test on may possible links between two MDTUs and between various wireless sensors and MDTUs. Preferably, the novel IoT network software is designed to determine many or all wireless network links and frequencies of transmission and modes of transmission of those links, to maximize average received signal strength in the set of links, reduce or minimize average noise in the set of links, or maximize average signal to noise in the set of links. Preferably, the novel IoT network software performs this network analysis, and the implements a minimization algorithm, such as a multi-variable least squares analysis, to arrive a configurations that increase average received signal strength, reduce average noise, or increase average signal to noise.

Preferably, the novel IoT network also stores the sensitivity of each receiver for wireless devices included in the network, and stores data defining the average background noise level as a function of frequency for each of the receiver locations of the network. Preferably, the minimization algorithm is constrained to select links to each device that result in a signal strength above the average background noise ratio for that device, and above the sensitivity threshold for that device.

To minimize network induced noise, the novel IoT network may attempt to maintain distinct transmit/receive frequency bands or use time division for relatively physically closely spaced links of the network.

To minimize network induced noise and maximize signal to noise, the novel IoT network may calculate from locations of MDTUs and sensors, a direction of a transmitter to the corresponding intended receiver, and instruct the transmitting MDTU or sensor to configure antennae parameters to shape its transmit beam with high intensity propagating in the calculated direction.

To minimize network induced noise and maximize signal to noise, the novel IoT network may attempt to maintain distinct transmit/receive frequency bands or use time division, for relatively physically closely spaced links of the network.

4.4 Splitting Data Stream

The novel IoT network may execute software that results in a node of the network "splitting" a stream of data originating from one sensor and intended for an ultimate destination node. That node may be the MDTU to which the sensor is linked, That node may be a node receiving a stream of data from the MDTU to which the sensor is linked.

Splitting a stream of data means operating on a data stream directed to an ultimate destination node, by transmitting different portions of the stream along different paths (nodes), that all end at the ultimate destination node. In other words, different portions of the stream take different paths, along different nodes, to the ultimate destination node. The stream refers to digital data. The stream may comprise digital data representing various phenomena, such as, but clearly not limited to, audio signals, video signals, telemetry, control information, data specification information, identification information, and time information. In one example, the information for carrying out the transmission of the data stream is stored in the mapping table of an MC System.

Preferably the novel IoT network stores data defining values for link latencies, link bandwidths, and rankings for data type by time sensitivity and bandwidth requirement.

Preferably, at least some of the nodes of the novel IoT network employ latency and bandwidth ranking algorithms to determine data type, and match data types having relatively high time sensitivity (compared to other types of data) to relatively low latency paths to their ultimate destination node. Preferably, at least some of the nodes of the novel IoT network employ algorithms to determine data type, and match data types having relatively high bandwidth (compared to other types of data) to network links providing relatively high bandwidth.

Preferably, the data stream for one or more sensors contains data type identifiers identifying the underlying type of data in the stream. Preferably, the latency and bandwidth ranking algorithms include code to inspect the data stream and determine data type identifiers and associated data having that type.

Preferably, the latency and bandwidth ranking algorithms include code to determine frequency of variation of certain sensor data, and values of certain sensor data in the stream. And preferably, the bandwidth ranking algorithms include activation code based upon frequency of variation of certain sensor data, and values of certain sensor data in the stream, to activate splitting of the stream. For example, in case temperature value increases above a certain rate, or a smoke concentration value exceed a specified level, then latency and bandwidth ranking algorithms may trigger splitting of a data stream comprising video, smoke and temperature data by sending the smoke and temperature data over a path to the ultimate destination node for the stream that has low latency, and sending the video data over a path that has relatively high bandwidth, but relatively large latency. For example, the low latency path may be over a channel using conductive power grid wires, and the high bandwidth high latency path may be over a channel connecting through a satellite.

4.5 Sensor Adjustment

Preferably the novel IoT network executes software for adjusting at least some of its sensors. Sensor need adjustment for various reasons. Some sensors are not preset to provide correct values. Some sensors have responses that drift over time.

Preferably at least some of the sensors of the novel IoT network are capable of having their values adjusted. Adjustment includes for example an offset bias, a scale factor, and a functional form change.

For example a sensor expressing a voltage as a function of a resistance may have a drift in voltage in case the resistance value increases over time due for example to material fatigue. In this case, an adjustment would be a scale factor.

A sensor whose electronics outputs an analog value representing wind velocity as a function of measuring a wind pressure may define a square wind pressure (wind velocity scales as the square wind generated pressure). A spring used to transduce the pressure may stiffen over time, and the elements of the electronics may have values that drift over time. Consequently, this sensor may require both scale, functional form, and bias adjustments.

Adjustments may be to analog adjustment circuit elements reading the value from the transducer, or compensation to a digital representation of the output of the transducer. In case of adjustments to digital output, this may occur proximate the sensor or remote from the sensor at some node of the network.

Preferably the novel IoT network executes software for adjusting at least some of its sensors based upon results of correlation with historical values for that sensor.

Preferably the novel IoT network executes software for adjusting at least some of its sensors based upon results of correlation to values of that sensor to values of other sensors. For example, two temperature sensors in close proximity can be assumed to measure the same average temperature. An average temperature for the first sensor may be used to adjust the average value of the second sensor to provide the same values as the first sensor. For another example, a type of sensor may have a known variation or drift in output, as a function of time based upon measurement of prior sensors of the same type. The novel IoT network executes software for adjusting for this known time dependent based upon the age of the sensor and the known time dependence of drift.

Preferably the novel IoT network executes software and a correlation algorithm for correlating values of like sensors in disparate location, by modeling, for example by interpolation using geographic positions, the most likely value for one sensor based upon a number of other nearby sensors. For example, a number of temperature sensors at ground level at disparate locations can be used to define a two dimensional temperature variation at ground level, as a function of surface coordinates, that is a model of a two dimensional function, in a plane. And the value of any sensor along the plane may be assumed by the novel IoT network to be the value defined by the model for the corresponding point in the plane. The novel IoT network may then execute software to control an adjust for that sensor to provide the value defined by the model for that sensor's location.

As noted, the novel IoT network may, in fact, not adjust the electronics of an integrated sensor so that the output of that sensor provides a corrected analog or digital value. Instead, the novel IoT network may store compensation values, or a compensation function to compensate for values generated by the sensor, and then apply the compensation to the output of the sensor, so that the resulting value is likely a more accurate representation of the physical value being measured than what the value the sensor provides. In this way, the novel IoT network may compensate for drift in sensor outputs relative to the actual value of the physical parameter, without actually adjusting the sensor's transducer, analog electronics, or the digital values output by some integrated sensors.

4.6 Downlink Channel Dynamic Adjustment

Preferably the novel IoT network executes software to dynamically adjust sensor data sampling rate, data precision, and frequency of transmission. That is, the downlink signal from an MDTU instructs the sensor to change at least one of that sensor's sampling rate, data precision, and frequency of transmission. The network software may instruct adjustment as a result of data received by the network, and as a result of network condition. For example, the network software may respond to a large number of sensors providing abnormal indications, such large audio signals, or unusual brightness, in one region by reducing the data precision and increasing the frequency of transmission of other sensors in the same region or near the same region. For another example, the novel IoT network may generate network usage data showing volume of data transmission between nodes, ratio of total network CPU clock cycles per second used for processing utility software task compared to total network CPU clock cycles per second. That is, the network may measure its fraction of data communication capacity and calculational capacity in use. The novel IoT network may run software to reallocate utility software tasks reallocate from nodes in a geographic region having relatively high CPU usage to nodes in a region having relatively low CPU usage. The novel IoT network may run software to reallocate network paths from nodes and links operating at or near their bandwidth limit to nodes and links operating further below their bandwidth limits. Using the same indications of high CPU usage or high bandwidth usage in a geographic region the novel IoT network may execute software the instructs sensors in that geographic region to reduce their load on that region of the network, by reducing sensor data sampling rate, data precision, and frequency of transmission. The novel IoT network may execute software that also identifies sensors transmitting data across a region of the network identifies as overly loaded (in CPU usage of bandwidth) and instruct those sensors to reduce sensor data sampling rate, data precision, and frequency of transmission. In correspondence, the same software may instruct sensors to resume their default data sampling rate, data precision, and frequency of transmission when network conditions no longer indicate a need to reduce network load.

5. IOT NETWORK DATA SECURITY, AUTHENTICATION AND ENCRYPTION

Preferably the novel IoT network is configured with novel security to prevent data hacking, adverse network control, and to provide message and data authentication.

5.1 Sensor Hash

One novel security measure comprises an integrated sensor applying a hash function to a digital sequence, such as a binary sequence, which sequence is the output of a pre-function.

5.2 Sensor Hash Pre-Function

The sensor hash pre-function, also referred to as pre-function, is a function of at least one of digital values for the sensor's sensor ID, the sensor's sensor location, and the sensor's sensor time.

The pre-function may also be a function of additional digital values, such as the identification and/or address of the MDTU linked to the sensor, the identification and/or address of the ultimate address node for a message, and other IoT network node identifications and/or addresses that can form a set of links from the MDTU to the ultimate node, a digital value broadcast and/or IP multicast to a plurality of nodes of the network, and time of receipt of a network timing pulse.

Preferably, the pre-function is also a function of part or all of a sensor message in either unencrypted or encrypted form, as discussed below. Moreover, the sensor message may be a function of one or more sensor sample values for a physical property sensed by the sensor.

Because the sensor hash is a function of the output of the pre-function, the sensor hash is also a function of the inputs to the pre-function. Thus, the sensor hash is a function of (1) at least one of digital values for sensor ID, the location, and sensor time and optionally two or all three; (2) may be a function of the ID and network address for the MDTU linked to the sensor, the ID and/or network address an ultimate destination for a sensor message, and IDs and/or addresses of other nodes of the network; (3) may be a function of a digital value broadcast and/or IP multicast to a plurality of nodes of the network; (4) may be a function of a network timing pulse; and (5) preferably is a function of part or all of a sensor message in either unencrypted or encrypted form.

Preferably, the pre-functions are not hash functions, and are invertible functions, such as permutations of digital sequences, so that the digital sequence input to a pre-function can be retrieved by applying the inverse function of the pre-function to the output of the pre-function. However, the pre-functions may be non-invertible, and the pre-functions may be hash functions.

Preferably, the integrated sensor represents the digital values as binary data, that is as binary sequences. Preferably the pre-function concatenates, in a predetermined order, the binary sequences representing the digital values that are the inputs to the pre-function, and outputs the resulting concatenated sequence. Preferably, the hash function inputs the concatenated sequence output by the pre-function. The output of the hash function is the sensor's sensor hash.

The integrated sensor may employ different hash functions, different pre-functions, and different encryption algorithms and encryption keys, at different times, for use with different types of messages, and for different message recipients. The integrated sensor may execute software that controls which hash function, pre-function, encryption algorithm, and keys, to use, depending upon time, type of message, and message recipient. The integrated sensor may receive instructions from an MDTU specifying conditions for the integrated sensor to use particular hash functions, pre-functions, encryption algorithms, and encryption keys.

5.3 Sensor ID

The sensor's sensor ID may be either a non programmable hard coded value stored in the sensor during sensor fabrication or a value stored in readable and writeable memory of the sensor, and the sensor's sensor ID may be a combination of both the non programmable hard coded value and value stored in readable and writeable memory of the sensor.

5.4 Sensor Time

The sensor time is a value stored in the sensor. The sensor time may be a time that the sensor will transmit a message, a time when a sampling period begins or ends, a time when the transduced physical value is subject to ADC conversion, a time when digital electronic encoding of the digitally converted sampled value occurs, or a time when the sensor transmits the encoded value. This time value need not be relatively close in time to when the physical parameter being measured by the sensor was sensed by the sensor. However, a time when the sensor obtained a value for a physical parameter may be included in a message.

5.5 Sensor Location

Sensor location refers to coordinates in a defined map or frame of reference. Preferably, the sensor stores its coordinates in memory. Alternatively, or in addition, the sensor may store times of arrivals of signals transmitted from spatially diverse transmitters, such as satellite GPS transmitters along with identifications of the source transmitters, or may store differences of times of arrivals of pairs of such transmitters. The sensor location may be calculated from differences of times of arrival, for signals transmitted from at least three transmitters, the locations of the transmitters at the times the signals were transmitted, and the signal propagation velocity.

5.6 Sensor Message

A sensor message is a message that the sensor transmits. A sensor message may comprise data representing measurements by the sensor of at least one physical property, such as temperature, pressure, light intensity, light intensity in a particular wavelength band, sound intensity, etc. Alternatively or in addition, a sensor message may comprise information about the sensor, such as sensor status data, or for an integrated sensor software version data, usage statistics, and any other data stored by the integrated sensor that does not correspond to measurements of physical parameters obtained by the integrated sensor.

5.7 Integrated Sensor

Integrated sensors may provide measurements of more than one physical property, that is have more than one kind of transducer, and an integrated sensor message therefor may comprise data representing measurements of more than one physical property.

An integrated sensor preferably includes software or hardware for applying a hash function, and also for applying an encryption algorithm. The sensor's hardware may include hard coded routines in static memory for reading data including at least one of the values for sensor ID, sensor time, and sensor location, and applying the hash function to the read data.

The integrated sensor may comprise: a CPU, digital memory, a data bus, a receiver (or transceiver), digital memory, a sampling controller controlling sampling of the value of the physical value transduced by the sensor, and software and data resident in the memory. The software installed on the integrated sensor comprises an operating system controlling interaction of the CPU and other physical components, such that the CPU can read and write from the memory, and send control signals to the receiver (or transmitter) to specify receiver (and transmitter) settings, and to the sampling controller to specify settings (adjustments, sampling rate, sensitivity, precision) of signals corresponding to values of physical parameters measured by the sensor's transducer. The software is configured to read from the memory values including values for at least one of sensor ID, sensor location, and sensor time. The software is configured to apply at least one hash function to the read values. The software is preferably configured to apply at least one encryption algorithm to a portion of a message stored in the sensor's memory.

Preferably, the integrated sensor includes software or hardware implementing a clock function, the clock function preferably stores at least one time value in the memory, and preferably the software is configured to read this memory to retrieve at least one time value stored in memory by the clock function. Preferably, the software comprises a clock calibration routine that reads a value contained in a time signal transmitted by the MDTU. The clock calibration routine preferably resets the integrated sensor's clock function to provide the same as the time value of the time received from the MDTU. The integrated sensor may also be programmed to receive a network value transmitted from the MDTU, store that value in memory of the integrated sensor, and use that value instead of or in addition to a time value, when generating a sensor hash. The network value transmitted from the MDTU may be a value broadcast and/or IP multicast within the network.

The integrated sensor may comprise a transceiver for receiving data from an MDTU and transmitting data to an MDTU. The transceiver comprises an antenna, a mixer, and an ADC. Alternatively, the integrated sensor may be linked to the MDTU by a wired network connection, or by a system bus.

Preferably, the integrated sensor comprises software responsive to signals from an MDTU defining at least one of the integrated sensors's transmission and reception frequencies, or frequency bands, data rate, transmitted power, size of data package, data package structure, modulation scheme, information coding scheme, and receiver sensitivity. That is, integrated sensor can preferably be controlled by signals from an MDTU.

5.8 Sensor Message Authentication Using Sensor Hash 5.8.1 Conventional Authentication Nodes of the novel IoT network receive data transmit units containing both a payload and a sensor hash. The receiving node may apply a hash function to the payload to determine if the payload is authentic. If the sensor applied the same hash function as the receiving node, to the payload in the data transmit unit, then a match of the receiving node hash and the sensor hash indicates the payload is authentic.

5.8.2 Unconventional Authentication

The integrated sensor and nodes of the novel IoT network however may transmit data transmit units that have payloads that do not include all bits of a binary sequence used to generate the hash included in the data transmit unit. In these implementations, a node receiving the data transmit unit may still authenticate the a data transmit unit. The receiving node may do so by guessing the missing binary bits from the payload necessary to compute the sensor hash. The receiving node can guess the missing bits by knowing the specification for the missing data and possible values for the missing bits. The specification for the missing data includes bits for: at least one of digital value for sensor ID, sensor location, and sensor time. The specification for the missing data may includes bits for either of both of the other ones of digital values for sensor ID, sensor location, and sensor time. The specification for the missing data may also include: IDs and network address for network nodes; digital values broadcast and/or IP multicast to a plurality of nodes of the network; and time values associated with network timing pulses. A receiving unit that guesses the correct values for missing data and computes the hash of the missing data and payload, the receiving nodes hash will equal the sensor hash.

A receiving node can cycle through permutations of the values for missing data, compute hashes of those permutations in combination with the payload, and compare each of those hashes to the sensor hash. A match indicates both authentication of the payload, and identifies to the receiving node, the missing data.

The missing data and the payload are referred to as test data. Nodes of the novel IoT network that receive a data transmit unit containing a sensor hash may apply a hash function to test data to generate a receiving node hash. Preferably, the test data includes at least one of sensor ID, sensor location, and sensor time. The test data may include the receiving node's ID and/or address, other network node IDs and/or addresses, a digital value broadcast and/or IP multicast to a plurality of nodes of the network, and a network timing pulse. The network node may compare the receiving node hash to the sensor hash. If the hashes match, that indicates the data transmit unit is from the sensor having the sensor ID, sensor location, or sensor time contained in the test data.

Assuming authentication, the additional address information in the test data may be interpreted by the node as instructions. For one example, if the receiving node's ID or network address is not present in the test data, the receiving node may discard the data transmit unit. For another example, if the receiving nodes ID or network address is in a sequence of addresses in the data transmit unit, then the receiving node may transmit the data transmit unit to the node having the ID or address sequentially following the receiving node's ID or address in the data transmit unit. For example, if the receiving nodes ID or network address is the last ID and/or address in a sequence of IDs and/or addresses in the data transmit unit, the receiving node may decrypt encrypted message data and store message data received in the data transmit unit, in node memory.

5.9 Sensor Message Encryption 5.9.1 Entire Message Encryption

In one alternative, the integrated sensor executes an encryption algorithm by inputting the entire sensor message into the algorithm to generate an encrypted version of the entire message. Subsequently, the integrated sensor forms sufficient data transmit unit so that the entire message is transmitted to the MDTU.

Subsequent to entire message encryption, the integrated sensor selects some sequence of N bits from the binary representation of the entire encrypted message. The integrated sensor includes the selected bits to be the part of the input originating from the message, that is input to the pre-function to generate an output of the pre-function.

Preferably, N equals the number of bits of a message to be included in a data transmit unit. The integrated sensor also generates a corresponding data transmit unit including this sequence of N bits from the binary representation of the encrypted message. Preferably, the integrated sensor stores information identifying which sequence of bits from the encrypted message correspond to the particular output of the pre-function. The integrated sensor will then be able to retrieve the sequence of N bits from the binary representation of the encrypted message, in order to construct the data transmit unit, by retrieving the stored information. The integrated sensor preferably generates a sensor hash from the output of the pre-function.

If N is greater than the number of bits in the binary representation of the entire encrypted message, the integrated sensor can pad the additional bits of the data transmit unit.

If N is less than the number of bits in the binary representation of the entire encrypted message, then the integrated sensor may select another sequence of N bits from the binary representation of the encrypted message, and generate another output of the pre-function, another sensor hash, and another data transmit unit.

The integrated sensor may repeat these steps until sensor has processed all bits of the binary representation of the encrypted message (along with other data) into outputs of the pre-function, and the integrated sensor has included all of the bits into corresponding data transmit units.

5.9.2 Encrypting the Message, Portion by Portion

In one alternative, the integrated sensor executes an encryption algorithm by inputting a portion of the message into the encryption algorithm to generate an encrypted version of the message portion. Here, message portion means less than all of the message. Subsequently, the integrated sensor calculates outputs of the pre-function, calculates sensor hashes from these outputs, and forms data transmission units. Each data transmission unit includes an output of the pre-function and the sensor hash of that output, following the procedure just described in the "Entire message encryption" section. Preferably, in this alternative, the binary representation of the each encrypted message portion has the same number of bits as the message portion of each data transmit unit, and each data transmit unit includes exactly one encrypted message portion.

The integrated sensor repeats the process of executing the encryption algorithm on portions of the message, calculating outputs of the pre-function, calculating sensor hashes, and forming data transmission units, until all portions of the message have been encrypted and included in data transmission units.

5.9.3 Encrypting Only a Portion of the Message

In another alternative, the integrated sensor encrypts some portions of the message and does not encrypt other portion of the message. In this alternative, all bits corresponding to both the encrypted portion and the unencrypted portion of the message are included as inputs to the pre-function, associated sensor hashes are calculated for each output, each output is included in a data transmit unit.

The purpose of the integrated sensor generating data transmit units is to transmit the message data. The integrated sensor transits its data transmit units to the MDTU to which it is linked.

5.9.4 Network ID and Address Hiding

In some embodiments of the pre-function, the inputs to the pre-function that are not message data are decoupled from inputs that are message data, such that the output of the pre-function based upon specified non message data input is unchanged by variations in message data. For example, assume the non message data input to the pre-function is a sequence of binary values that are the concatenation of binary values for sensor ID, sensor location, and a network ID, and that sequence occupies N bits. In one embodiment of the pre-function, the first N bits of the output of the pre-function are identical to the first N bits of the input to the pre-function, independent of values for message data. In another embodiment of the pre-function, the first N bits of the output of the pre-function are a permutation of the order of values of first N bits of the input to the pre-function, again independent of values for message data. In these examples, a receiving node, knowing the pre-function and knowing the specification for the missing data missing from a payload, and knowing possible values for the missing data, may guess the missing data, apply the pre-function to the concatenation of the guess of the missing data and message data in the data transmit unit, and apply the hash function to the output of that pre-function to form a receiving node hash. The receiving node can determine if the receiving node hash matches the sensor hash. A match indicates the message is authentic and identifies the missing data associated with the payload.

Data transmit units normally contain address information in unencrypted form, typically as part of a header as specified by a protocol. The address information is used by nodes for routing data transmit units. The data transmit units and protocol associated with this kind of network ID and address hiding may also contain address information in unencrypted form. However, they may also exclude address information and instead rely upon the missing data specification and limited optional values for missing data, and the ability of network nodes to determine the missing data, and therefore address information, based upon authentication. In one embodiment, a node receiving a pulse that identifies the missing data to include the address or ID for that receiving node may act on the data transmit unit, pursuant to the protocol, such as to retransmit the pulse, decrypt the pulse, or take some other action defined by the protocol and the data in the data transmit unit. If the node receiving the pulse does not identify in the missing data an address or ID for that node, then that node may take no action in response to receiving the data transmit unit, or it may multi cast the data transmit unit so that other nodes can identify the missing data and determine if they should act on the pulse based upon the missing data. If the node receiving the data transmit unit does not identify in the missing data an address or ID for that node, but does identify an address or ID for another node, then that node may forward the data transmit unit to the other node.

Using a protocol in which the data transmit units do not include data transmit unit address information explicitly, and instead rely upon authentication based upon determinable missing data to determine data transmit address information, precludes network attacks that rely upon knowledge of data transmit unit address information.

Another alternative network protocol employs the embodiment of the pre-function, in which the first N bits of the output of the pre-function are a permutation of the order of values of first N bits of the non message data input to the pre-function, and these N values include address information. In this protocol, the node receiving the data transmit unit would apply the inverse function for the portion of the pre-function operating on the first N bits of input, to output the N bits of non message information. This message information as noted may contain address information.

5.9.5 Sensor Message Encryption

Another novel security measure comprises how the integrated sensor encrypts a message.

Preferably, and as noted above, message encryption occurs before generating a sensor hash for a data transmit unit.

The integrated sensor implements an encryption algorithm of the type that takes at least two inputs, one input being an encryption key, and another input being a message. The encryption algorithm may take other inputs.

5.10 Encryption Key Generation

The encryption key may be the output of a key generating algorithm. The key generating algorithm preferably is a pseudo random number generator.

Preferably, an input to the key generating algorithm is sensor data that results from measurement of a physical quantity (for example, temperature) in order to introduce randomness into the resulting key value. Inputs to the key generating algorithm may comprise one or more of a sensor hash, sensor location, sensor time, ID and/or network addresses for: the sensor's MDTU, the ultimate destination node, and other nodes; a value broadcast and/or IP multicast in the network; and time of receipt of a value broadcast and/or IP multicast in the network Inputs to the key generating function may comprise a sensor hash and IDs and/or network addresses of a set of nodes defining a path from the MDTU to the ultimate destination address for a message.

The resulting encryption key generated by the integrated sensor may be shared secretly with an intended recipient using a public-key crypto-system by encrypting the resulting encryption key using the intended recipient's public key and the asymmetric encryption algorithm specified for the crypto-system and transmitting that resulting key to the intended recipient in one or more data transmit units. The intended recipient can authenticate the received data transmit units in the manner discussed above to confirm the data transmit units originate from the integrated sensor. Similarly, the intended recipient MDTU can generate a pseudo random key using the resulting encryption key generated by the integrated sensor, a seed, and a pseudo random number generator, and then share that resulting MDTU generated key secretly with the integrated sensor using the integrated sensor's public key and the asymmetric encryption algorithm specified for the crypto-system, and transmitting that resulting MDTU generated key to the intended integrated sensor in one or more data transmit units. The MDTU and integrated sensor may use either the resulting encryption key generated by the integrated sensor or the resulting MDTU generated key, and a symmetric encryption algorithm, to encrypt messages and send data transmit units containing those messages to one another.

Preferably, the integrated sensor stores the encryption algorithm, key generating algorithm, and resulting encryption key or keys, in memory. However, the algorithms may be hard coded in digital circuits. The integrated sensor may use the same or different encryption keys to encrypt more than one data transmit unit, or more than one message.

Symmetric encryption algorithms employ the same key for encryption and decryption. Asymmetric encryption employs an one key for encrypting key and another key for decrypting in a manner well known in the art, and asymmetric encryption may be used in public-private key schemes, in a manner well known in the art. An example of a symmetric encryption algorithm is AES-128. An example of an asymmetric encryption algorithm is RSA. Source code for implementing these and many other encryption algorithms are widely and freely available.

The sensor hash used for encryption may be different from the sensor hash used for authentication. For example, the hash function used for encryption may different from the hash function used for authentication. For example, hash function to provide a n digital bits may be implemented sequentially removing all odd digital bits, checking to determine of the result is less than 2n digits, and if so, truncating the result to the first n digital bits. And repeating the process for results larger than 2n digital bits until the number of bits is less than 2n. Another hash function may use the same algorithm, but chose a different value for n.

For another example, the hash function used to generate a hash for encryption may be the same function as the hash function used for generating a hash for authentication, but use a different time value, or a different location value, to generate a hash. For example, the hash function used for encryption may use a time value based upon time of data acquisition, an anticipated time of message transmission, time when the hash used for encryption is created, when the message is encrypted, or time of an IoT network timing pulse, and may use an location value of the integrated IoT sensor at any one of these times. And the hash function used for authentication may use a time value based upon time of data acquisition, an anticipated time of message transmission, time when the hash used for authentication is generated, or time valued provided by an IoT network timing pulse, and may use an location value of the integrated IoT sensor at any one of these times.

5.11 MDTU Transmissions and Node Re-Transmissions

The MDTU may transmit data transmit units to the other nodes in which each data transmit unit contains a sensor hash resulting from information from the corresponding sensor from which the message information in the data transmit unit originated.

For integrated sensors that are themselves physically integrated into an MDTU, everything discussed above about the function and structure of the integrated sensor also applies to the MDTU. For example, the MDTU may generate and transmit the data transmit units containing message data as discussed above for the integrated sensor, including performing the encrypting and hashing.

For sensors that merely provide, to an MDTU, transduced values or digital representations of transduced values, and do not perform the authentication and encryption noted above in discussing integrated sensors, the MDTU generates and transmits the data transmit units containing message data as discussed above for the integrated sensor. This includes the MDTU performing the encrypting and hashing and preparing the data transmit units.

The MDTU may also use the sensor hash in a data transmit unit received from an integrated sensor, as the input to a pseudo random number generator. The MDTU may use the output of the pseudo random number generator as an encryption key. The MDTU may further encrypt message data in a data transmit unit using the new encryption key. The MDTU may further encrypt message data of a data transmit unit using the new encryption key. The MDTU may use the output of the pseudo random number generator to negotiate a secret key with another node for asymmetric encryption with that other node and then further encrypt message data of a data transmit unit, using that new encryption key. The MDTU may input the further encrypted message data into a hash function, to generate an MDTU hash, and include that MDTU hash and the further encrypted message data in a data transmit unit, and transmit that data transmit unit.

A node receiving the data transmit unit from the MDTU may use the MDTU hash as input to a pseudo random number generator, use the output of the pseudo random number generator or the hash as an encryption key, or use the output of the pseudo random number generator or the hash as an input to negotiate a shared encryption key with another node using a public key architecture, and then further encrypt message data of the data transmit unit that node received from the MDTU, using that shared encryption key. The node receiving the data transmit unit from the MDTU may input the further encrypted message data into a hash function, to generate an node hash, and include that node hash and the further encrypted message data in a data transmit unit, and transmit that data transmit unit to the other node having the shared encryption key.

Any subsequent node receiving the data transmit unit from the prior node may use the prior node's hash as input to a pseudo random number generator, or use the output of the pseudo random number generator or the hash as an input to negotiate a shared encryption key with yet another node using a public key architecture, and then further encrypt message data of the data transmit unit that node received from the prior node, using that new shared encryption key. The subsequent node receiving the data transmit unit from the prior node may input the further encrypted message data into a hash function, to generate an subsequent node hash, and include that subsequent node hash and the further encrypted message data in a data transmit unit, and transmit that data transmit unit to the other node having the shared encryption key.

One benefit of the process of encryption and hash functions depending directly or indirectly upon the sensor hash for encryption and/or authentication is that the sensor hash may contain transduced data which provides the randomness required to defeat security attacks.

5.12 Example of an MDTU Hash Function and Use for Encryption

In one embodiment, a sequence of 128 bit values may represent each one of sensor ID, sensor specified location, and time value a message was received from the sensor at its linked MDTU. The MDTU forms a binary sequence of 128×3 bits by concatenating the 128 bit values representing sensor ID, location, and time. The MDTU applies a hash function to that 128×3 sequence, for example resulting in a 128 bit sequence.

The MDTU may use that hash as an input to an encryption algorithm, such as a key or as a secret for transmission by a public key architecture to another node to negotiate a session key with that other node. Or the MDTU may use the hash as a seed for a pseudo random number generator to generate one or more values. The MDTU may then for use the resulting one or more values in an encryption algorithm, such as one or more keys for an encryption algorithm or as the MDTU's secret for transmission by a public key architecture to another node to negotiate a session key with that other node.

The MDTU executes an encryption algorithm that uses the resulting encryption key and part or all of the data from one or more sensors, and then transmits that data to the other node of the network. For example, the MDTU may encrypt sensor data, but not destination data. For example the MDTU may or may not encrypt sensor ID. For example, the MDTU may or may not encrypt it time stamp (time associated with the MDTU's receipt of the sensor data). For example, the MDTU may keep the destination data (such as network address of a node), sensor ID, sensor specified location, and MDTU time stamp, or any combination thereof, unencrypted and transmit this data in unencrypted form.

5.13 Hash Physical Location, Time, and Sensor ID. Hash (Location, Time, Sensor ID)

Network nodes each have a physical location, a time of data acquisition (for example time stamp associated with receipt of data transmit unit or complete stream of data transmit units defining a file or message), and an ID.

Each node may compute a hash function using as inputs at least one of node location, time, and node ID. The hash function inputs may also include data from one or more data transmit units received at the node. Preferably, hash function inputs comprise both time of data acquisition and at least some of and optionally all of the content of a data transmit unit associated with that time of data acquisition by that node.

Each node may use the hash it computes for encrypting a data transmission. The node may use the hash as an encryption key, use the hash as a seed to generate a pseudo random number, or use the hash or pseudo random number as a secret for use with a public key infrastructure to negotiate a shared secret with another network node. It is well know generate a shares secret key using a public private key infrastructure negotiation.

Each node may encrypt the messages it receives prior to retransmission. Alternatively, each node may retransmit received messages without further encryption.

Each node has the capability to determine a node to which to send a received message. This capability preferably includes the node executing code to determine a network address to which to transmit data transmit units containing the message. As noted above, a node may transmit different data transmit units for the same message, that contain different kinds of data, such as video data and temperature data, along different links to the same ultimate network node. So the high bandwidth video data travels along one path and the low bandwidth temperature data travels along another path, for example to minimize latency for the temperature data, and to efficiently transmit the video data to its destination. This routing may depend upon network addresses stored in table in memory of the node, which table also includes a field for at least data type, and preferably also includes fields for source ID or address, destination ID or address. In some embodiments, this capability results from the node being able to decode unencrypted path information in a data transmit unit, such as address information contained in a packet header. If the path, or ultimate address for the communication is contained in the header information, as in TCP/IP, then each node can either read the next node to which to send the communication or determine from the ultimate address a next node to which to send the communication. In packet switched networks, the contents of each packet may be individually encrypted, or the contents of an entire message may be encrypted and then broken up into pieces and each piece included in a data transmit unit. Each node may not encrypt the ultimate destination address or ID in a data transmit unit, or may not encrypt a sequence of nodes IDs or addresses in each data transmit unit to which the communication should be transmitted in sequence to reach the ultimate destination.

Alternatively, the communication protocols may also encrypt the defined or definable communication path, such as the sequence of nodes along which a communication should be forwarded, or the address of the ultimate node, that is the destination address for the communication. In these alternatives, the encryption of the address or path information is of a form that allows each node along the communication path to interpret the address information to either send the communication to the next defined node along the path or to determine a next node to which to send the communication. For example, each node may have a private key and a public key pair, encrypt its address based upon public key of the target node (to which the communication will be sent from that node) and include the encrypted form of its address in a data transmit unit. This would allow the recipient target node to decrypt the address of the sender nodes address based upon the recipient node's private key. Or the sending node may encrypt and include a sequence of node addresses and/or IDs with the recipient target node's public key. The recipient target node could then decrypt the sequence of node addresses and/or IDs with its private key. Each node may store a plurality of public keys each corresponding to the public key of a different node of the network, and determine the target recipient node by encrypting the message using that target recipient's public key. Only the target recipient node can would decrypt the message using its private key; all other recipient nodes would fail to decrypt using their private key. Decryption would, under this protocol, instruct the decrypting node to act on the contents of the data transmit unit or units containing the message. Failure to decrypt would, under this protocol, instruct the node failing to decrypt the message to take no action in response to receipt of the contents of the data transmit unit or units containing the message, other than perhaps to log the fact the node received and discarded the data transmit units.

5.14 Sequential Key Encryption, and Sequential Decryption to Retrieve Message Data In one embodiment, each node may modify at least one data transmit packet for each message, to include the symmetric encryption key that node will use to further encrypt that data transmit packet, in the portion of the data transmit packet subject to encryption. In this embodiment, when the data transmit packets arrive at their ultimate destination node, that ultimate destination node may apply the decryption algorithm in conjunction with the key ultimate destination node shares with the node that transmitted the message to it, to perform a first decryption. That decrypts the key used for the prior encryption by the prior transmitting node. The ultimate destination node may apply the decryption algorithm with the newly decrypted key, to decrypt the key used for the yet prior encryption by the yet prior transmitting node. The ultimate destination node may continue to sequentially apply the decryption algorithm with the newly decrypted encryption keys until it has reversed the encryption applied by the original integrated sensor of MDTU, to thereby decrypt the original message.

In embodiments, session keys generated by the nodes are transmitted to the ultimate network address for a sensor message along a different communication path than the corresponding data. For example, when the ultimate address is contained in the transmitted data, then each node along the path may encrypt its symmetric encryption session key and optionally its network address or ID and optionally the network address or ID of the node to which the node is transmitting the message, using a public key of the ultimate address and a public private asymmetric encryption algorithm. The node may then transmit that encrypted message containing key and optionally ID data, to the ultimate address. The node may direct encrypted message containing key and optionally ID data to some node other than the node to which it sends the sensor message; that is along a different path in the network than the underlying message data.

In a simulcast or ad hock network, the ultimate address is not predefined. In this situation, each node may be programed (configured) to send is key data to a central key server. The nodes may be programmed to use the central key server's public key and the corresponding public private asymmetric encryption algorithm to encrypt the session key and optionally the nodes network address or ID and optionally the network address or ID of the node to which the node is transmitting the message. Ultimate recipients of the encrypted data transmit units defining the message are preferably programmed pursuant to network protocol to query the central key server for decryption keys necessary to decrypt the message.

5.15 Distributed Ledger, Message Authentication, Chain of Custody

Preferably, the IoT network implements sensor data authentication using a distributed ledger and sequential permutations of the sensor hash. Preferably, the IoT network comprises a plurality of nodes that each stores in their memory a distributed ledger showing sequence of transactions, each transaction indicating transmission of a sensor message from one node to the next.

Preferably, each successive node of the network receiving data transmit units, implements a permuting function to permute the values of the bits of the data transmit unit in the location in the data transmit unit corresponding to the location of the sensor hash. The function is a function of the bit values at these locations, the ID of the sending node, and the ID of the receiving node. The output of the permuting function is included in the next data transmit unit, preferably in the same location the sensor hash was previously stored. Alternatively, the output of the permuting function may be stores at some other location in the data transmit unit, as defined by an applicable protocol.

Each time a node transmits a plurality of data transmit units defining a message, or each time the node transmits a single data transmit unit, it also transmit a ledger entry data transmit unit. The ledger entry data transmit unit contains the ID of the previous transmitting node ID, the ID of the current transmitting node, the current transmitting node's time, and the output of the permuting function. Each successive transmission of a message or data transmit unit results in sending of a ledger entry data transmit unit. The ledger entry data transmit units are broadcast or IP multicast to ledger nodes programmed to store and validate copies of the distributed ledger.

Each ledger should contain two records for a node ID closely linked in time, with the node ID in one record in the record field indicating that node is receiving the message and another entry of the node ID in the record field indicating that node is sending the message. Each ledger nodes executes code to associate these pairs of records for the same message in sequence, and thereby builds a sequence of record entries linking transmissions of the same message or message data units containing the same message data between nodes. The value of the permuting function in each transaction record is a function of the value of the permuting function in the prior transaction record and the values of the node IDs in the current record. Each ledger node can therefor calculate what the value for the permuting function should be in the current ledger, by computing that value from the values in pairs of records linked by node ID. Each ledger node can also check the time in pairs of records to determine if the time of receipt by a node is later than the time of transmission to that node of the same message or data transmit unit. A ledger node may publish its results to the other ledger nodes of that ledger node's time sequence check and permuting function check on two ledger entries for a node ID. The ledger nodes may implement consensus software to determine whether to accept the ledger entry. If all or a specified number of ledger nodes confirm the output of the permuting function matches the newer ledger entry and the time sequence of the two entries is correct, the ledger nodes may accept the new ledger entry. Otherwise, the ledger nodes reject the new ledger entry and do not finally include that ledger entry in the ledger. In this case, the ledger nodes may implement notification to the network of repudiation of the message or data transmit unit.

Alternatively, in an embodiment, the nodes of the network are programmed to transmit a ledger entry data transmit unit and wait for the ledger nodes to transmit back a verification that the corresponding message is legitimate, before transmitting the data transmit unit or units containing the corresponding message data to the next node.

A single ledger node would be sufficient. A security benefit of plural ledger nodes is redundancy and resilience against corruption of one ledger or ledger node. A security benefit of the distributed ledger node for an IoT network is that the permuting function acts on an original sensor hash that may be a function of transduced data. Transduced data is random, thereby increasing security.

5.16 Distributed Ledger, Two Factor or Multi Factor Authentication

Alternatively, in an embodiment, the nodes of the network are programmed to wait until receiving both a message or data transmit unit, and a verification from one or more ledger nodes that the corresponding message is legitimate, before transmitting the data transmit unit or units containing the corresponding message data to the next node. This process is analogous to the receiving node requiring two factor or multi factor authentication.

6. VIRTUAL REALITY (VR) REPRESENTATION BASED UPON SENSOR DATA 6.1 Data Fields In another aspect, a novel IoT network is programmed and/or configured to provide a Virtual Reality (VR) based upon sensor data collected from a plurality of sensors. Preferably, the virtual reality is implemented in software. Preferably, the virtual reality predicts a time progression of based upon sensor data collected from various sensors.

The VR comprises data structures defining a space having at least two and preferably three dimensions. Preferably, the space is a virtual representation of real physical space, and the dimensions are representations of two or three physical dimensions. The representations may be intrinsic representations (such as a representing points on a curved surface with two coordinate values), or extrinsic representations (such as a representing a curved surface embedded in three dimensional space with three coordinate values). Locations in the virtual space may be represented by a coordinate system defining axes that span the space. Each coordinate point (that is one point in the virtual space) may be associated with plural values. These values may be representations of quantities that are scalar, vector, second order tensor, and higher order tensor. A quantity having values at plural coordinates in a space is called a field.

Examples of scalar quantities that may form fields include temperature, light intensity, sound intensity, smoke density, wind magnitude, humidity, magnetic field strength. Examples of vector quantities that may form fields include gradients of fields of any scalar quantity, magnetic field strength and direction, and wind speed and direction, Newtonian gravitational field magnitude and direction. Examples of rank 2 tensor quantities that may form fields include the Cauchy stress tensor, electromagnetic tensor, viscous stress tensor, metric tensor, Einstein tensor, and the Stress-energy tensor.

Each one of the values stored in association with a coordinate point of a virtual reality may be a function of values of scalar, vector, and higher order tensors. These values may be values stored in association with that coordinate point, or may be a function of values stored in association with the same and/or another coordinate point.

For example, assume a set of three MDTUs reside at three points along a line in real space, or along an arc defining a loci of points approximately defining the surface of the earth. Assume that each MDTU normally provides sensor data for wind speed. Assume at some time the middle MDTU's wind speed sensor fails. The IoT network may be programmed and configured to respond to the failure by using values from nearby MDTUs to approximate a value for the middle MDTU and store that approximation in association with the location of the middle MDTU. For example, IoT networks may be programmed to calculate the average value of the other two wind speed sensors, and store in memory that average in association with a location associated with the middle MDTU. This provides an approximate value for the MDTU. The IoT network instead may approximate and store values for a failed sensor in other ways.

The IoT network instead may be programmed and configured to respond to the failure by retrieving the last value recorded by the failed sensor, difference between that value and the average value at a time proximate when the middle sensor failed, of the other two wind speed sensors, determining the difference between the last recorded value and that average value, and then at subsequent times to when the middle sensor failed, add that difference to subsequent average of the other two sensors to result in an estimate, and storing that estimate in memory in association with a location associated with the middle MDTU.

Instead of using a mere average, the IoT network may weight the inputs of the average based upon their relative distances to the middle MDTU. That is, multiply each value by the ratio of its MDTU's distance to the middle MDTU and then divide the result by the sum of the distances of both outer MDTUs to the middle MDTU. Instead of using only two MDTUs near the middle MDTU, the IoT network may average weighted values from all MDTU's within a certain distance from the middle MDTU. (For example, multiplying each value by the distance of its MDTU to the middle MDTU and dividing the result by the sum of the distances of all MDTUs including in the weighted average from the middle MDTU.)

6.2 Discrete Data Time Derivatives

Time derivatives calculated from sampled digital data normally refer to calculations based upon values at discrete time intervals instead of continuous function derivatives. It is to be understood that the determination of first and second time derivatives require values from at least one and two prior times, respective.

6.3 Composite Values

The IoT network may be programmed and configured to store a value in association with a virtual location that is a function of more than one value for more than one physical property for that location. For example, the IoT network instead may be programmed and configured to compute a composite value that is a function of values for smoke density, wind magnitude, and temperature from one MDTU at one point in time, and store the composite value in association with a location for that MDTU.

6.4 Time Derivatives

For example, the IoT network instead may be programmed and configured to compute a composite value that is a function of values for one or more of smoke density, wind magnitude, and temperature, and first and second time derivative of smoke density, wind magnitude, and temperature, from that one MDTU at one point in time, and store the composite value in association with a location for that MDTU.

6.5 Spatial Derivatives

The IoT network may be programmed and configured to store one or more spatial derivative values in association with a virtual location. Each spatial derivative value may be a function of values for a physical property from more than one location, or may be a function of composite values for physical properties from more than one location, where the locations are of MDTUs or sensors. The IoT network may compute each spatial derivative value by fitting the values and locations with which they are associated to a function, and determining the value of the function at the virtual location.

6.6 Human Interfaces Novel IoT networks may include VR display technology, for displaying scenes and optionally providing audio and other outputs from the virtual reality, to a user. For example by providing output to a conventional flat screen computer video monitor and audio transducer, or to an immersive headset display.

Novel IoT networks may be programmed to output to an immersive headset display a video image tracking the location and orientation of the user. For example, receiving location and orientation data from the headset identifying the changes in physical location and orientation of the person wearing the headset, and by performing coordinate transformation operations on the coordinate points storing the VR data, and then calculating a perspective view for certain values related to one or more physical properties and display those values within the headset.

Preferably, the data defining the virtual map or image representation is updated by a node of the IoT network within 100 milliseconds of when the node receives the data, that is, in realtime.

6.7 Predict Progression in Time of Virtual Reality (VR).

Preferably, the IoT network is programmed to predict field values at a future time based upon current and past values stored in the virtual reality, using field evolution algorithms.

For example, the field evolution algorithms, may input the current value, and first and second time derivatives for a physical property, or a composite of physical properties, for a location in the virtual reality, to determine time progression at that location for that physical property of composite of physical properties.

For example, field evolution algorithms, may model the spatial distribution of values for a physical quantity or composite quantity from various points in the VR at one time, and then determine from time derivatives of various points in the virtual reality, one or more velocities for the spatial distribution, and model the variation in time along the direction of that velocity, as propagation of the spatial distribution along the direction defined by that velocity, as a spatial displacement of the spatial distribution of values for a physical quantity or composite quantity along that direction. The field evolution algorithms may apply this same spatial distribution algorithm to different directions thereby defining different propagation velocities along different directions, and at different locations.

The IoT network may be programmed to determine averages and least squares values for predicted field values from outputs of more one time evolution and/or spatial evolution calculation.

6.8 Responses to and Effect on Time Evolution

The IoT network may be configured to run simulations of the effect of responses to sensor data on the predicted progression in time of VR scenarios, to predict how responses change time evolution. And to determine responses that maximize a particular effect on the time evolution of physical values.

For example, a response to a forest fire might be to drop a load of fire retardant in a particular area at a particular time. The IoT network may model that response as effecting a drop in temperature, a drop in smoke measurement, a reduction in velocity of spatial displacement of the spatial distribution of values for temperature, of the like. The IoT network may be configured to run simulations by varying the time of the drop of fire retardant, and location of drop of the retardant, to model effect on progression of the fire. The IoT network may be configured to determine the location and time that minimizes the velocity of the fire in one direction (for example towards a building), and output that information to either a person or an automated control of the vehicle that will drop the fire retardant. The simulation may be in advance of a real fire and the results of the minimization may be stored in memory of the IoT network.

In general, the IoT network may use a virtual reality model of sensor data to compute most effective activity to achieve a desired change in physical values, in response to sensor data. For example, where and how to allocate resources in response to remote sensor data. For example, where to send fire fighting equipment to most effectively contain and stop a forest fire. How to change traffic lights controlling traffic advance of severe whether, such as a local thunderstorms approaching an area from a certain direction, to minimize traffic congestion.

The IoT network may also store in the VR location and type of materials. For example, location of gasoline service stations, location of reactive chemical storage locations, quantity of chemical in storage, houses, commercial buildings, and zoning information therefore, such as residential, commercial, industrial, gas line locations, power line locations, water line locations, and communication line locations. For each type of location, the IoT network may store associated data, such as a flammability value indicating degree of flammability, an explosive value indicating likelihood of causing an explosion in response to heat, magnitude of explosion (dependent upon quantity of material) occupancy value indicating the anticipated number of people at the location, and other values for the location, local traffic conditions. The IoT network may employ algorithms to determine from time progression predictions and this additional data, when explosions as a result of a fire may be anticipated, and what responses if any might be effective to avoid explosion. For example, the IoT network may predict the amount of time to an explosion, and send an instruction to a fire response device (or person), based upon location, time, and results of VR time progression and response calculations, instructing on the most effective course of action. For example, take no action; travel to location of fire an extinguish fire; or travel to location of fire an order evacuation.

Given a suitably complete data set for a virtual reality, large numbers of possible scenarios based upon different starting conditions (such as weather, traffic, time of day, location and quantify of relevant materials, timing of street lights), and possible responses to the scenarios may be tested, to determine best responses. The IoT network may store the scenario inputs and best responses, for future use. The IoT network may run software algorithm that checks for a match of test parameter values or ranges to stored abnormal scenarios. Upon detecting a match, the IoT network may retrieve is stored response, and transmit information consistent with that response, given the location, time, and conditions relevant to the detected abnormal situation. The novel IoT network may also output results of VR scenarios and responses at any time.

The VR aspects may also be used to test potential home applications. For example, the VR aspects may implement a database of the home environment and provide examples of how the home environment and other conditions would update given changes to sensor data. This could allow more effective control of home heating and air conditioning, more effective decision making regarding the implementation of updated lighting, appliances, solar panels, or the like with respect to monthly energy costs, etc.

An MC System may be configured to include the VR aspects. This MC System preferably includes, along with the sensor information and mapping table, information regarding the home environment.

7. IP MULTICAST AND BROADBAND

Preferably, the novel IoT network uses IP multicast and/or broadcast technology in wireless and wired communication network to communicate punctually with sensors. Preferably, the novel IoT network controls some sensors in response to their sensing an abnormal situation. Preferably, the novel IoT network is configured to concentrate communication power, bandwidth and frequency of communications to one or more MDTUs and sensors related to the sensors sensing an abnormal situation, such as MDTUs and sensors an a geographic or logical region experiencing the abnormal situation.

7.1 Geographic Region Abnormality

Preferably, the novel IoT network is programmed to utilize IP multicast and/or broadcast technology to communicate punctually with a plurality of geographically diverse sensors. Preferably, one or more nodes of the novel IoT network determine that sensor data indicate an abnormal condition. The sensor data may from one sensor, from a plurality of sensors at the same location, or from a plurality of sensors at different locations. The one or more nodes are programmed generate a response to the sensor data. The response may include instructions for transmitting MDTU instructions, and/or sensor instructions, to a plurality of sensors associated with one or a plurality of MDTUs. The sensors to which the responsive instructions are sent may include only sensors distinct from those that generated the sensor data, may include a subset of the sensors that generated the sensor data, may include exactly the same set of sensors that generated the sensor data, and preferably include at least one of the sensors that generated the sensor data, and at least one sensor that did not generate the sensor data. Preferably, the sensors to which responsive instructions are sent include at least one of the sensors that generated the sensor data, and a plurality of sensors that did not generate the sensor data.

Preferably, each node that generates responsive instructions for a plurality of MDTUs and/or sensors employs IP multicast to specifically target the plurality of MDTUs and/or sensors to minimize the amount of data transmission over network links.

Moreover, when one or more nodes of the novel IoT network determine that sensor data indicate an abnormal condition for which the novel IoT network is programed to generate responsive instructions, the novel IoT network executes code to determine a suitable node for receiving additional sensor data from sensors whose data defines the abnormality and executing software to provide responsive instructions. The resulting suitable node will be the incident control node. The suitable node determination algorithm may take as input, geographic locations of at least one of, preferably at least two of, and more preferably all of, the sensors providing data indicating the abnormality, geographic locations of nodes of the IoT network, node resources including CPU capacity, memory, IoT link structure (which nodes are linked or linkable with which other nodes and bandwidth and/or latencies for each link), and the links required for each sensor providing the sensor data indicating the abnormality to communicate with a particular node.

The suitable node determination algorithm may estimate minimum node resources and bandwidth resources including CPU capacity and memory, required to receive subsequent data from sensors providing the sensor data indicating an abnormality and generate and transmit the responsive instructions.

The suitable node determination algorithm may perform a function that limits possible suitable nodes for generating responsive instructions, to those nodes having sufficient resources to respond, based upon the number of sensors and type of sensor data of sensors indicating abnormality, to determine a set of potential responsive nodes.

The suitable node determination algorithm may calculate the number of total links required for a each node of the set of potential responsive nodes to receive sensor data from sensors providing data indicating abnormality.

The suitable node determination algorithm may calculate the sum of geographic distance between each node of the set of potential responsive nodes and sensors or MDTUs having sensors providing data indicating abnormality.

The suitable node determination algorithm may calculate the sum of link latencies of paths from sensors providing the data indicating abnormality to each node of the set of potential responsive nodes.

The suitable node determination algorithm may calculate, instead of the sums, more general functions of the number of links, distances, and latencies. The suitable node determination algorithm may use the sums or outputs of the more general functions, as inputs to a node selection algorithm that provides values for each node of the set of potential responsive nodes. Alternatively, the suitable node determination algorithm also inputs (1) the output of the selection algorithm and (2) the estimate of node resources to provide values for each node of the set of potential responsive nodes. Preferably, the suitable node determination algorithm selects a node having the largest or the smallest output value, as the suitable node.

Preferably, the novel IoT network is programmed to instruct the suitable node to generate responsive instructions to the abnormal sensor data. Preferably, the novel IoT network is programmed to await a signal from the suitable node, indicating that the suitable node is taking over generating responsive instructions. For example, the suitable node may have to install incident response software necessary to generate responsive instructions, and that may require a finite amount of time during which the one or more nodes, by default, respond to sensor data indicating abnormality. If so, preferably the one or more nodes transmit to the suitable node, their instructions and any sensor data not also transmitted to the suitable node during the time the abnormality was identified and the time when suitable node indicates it is taking over generating responsive instructions.

The suitable node becomes the incident control node when it takes over generating responsive instructions.

The incident control node may perform several functions. One function incident control node may perform is determining from which sensors to receive sensor data. One function incident control node may perform is determining to which sensors to send instructions. One function the incident control node may perform is determining what instruction to send to sensors. One function the incident control node may perform is determining which other nodes to send instructions. One function the incident control node may perform is determining sampling parameters for a sensor, including sampling rate, ADC resolution, frequency of sensor data transmission from the sensor. One function the incident control node may perform is determining frequency of data transmissions from the MDTU associated with the sensor. One function the incident control node may perform is determining network path that the MDTU should use from the MDTU to the incident control node.

One function incident control node may perform, or that the incident control node may instruct another node to perform, or that may be performed by another node without an instruction to do so from the incident control node, is incident modeling. This modeling preferably uses sensor data as discussed above to predict which of the IoT sensors at future times will be associated with the incident. For example, which sensors the model predicts will provide abnormal values at future times as a result of modeling of the time progression of the abnormality. An abnormality may be for example, an atmospheric disturbance, such as a weather storm, earthquake, fire, network outage, environmental temperature extreme. An abnormality may be for example limited to sensor data in a single building or relatively localized area of a cluster of buildings, for example sensor data indicating abnormal atmospheric content, such as substantial carbon monoxide, carbon dioxide, natural gas, or water vapor, or other gas concentration.

An output of incident modeling may be a set of sensors or a geographic region for which the incident control node is programmed to generate instructions for those sensors or sensors in those regions, or for particular types of those sensors to transmit sensor data to the incident control node. For example, the output may be only a subset of sensors measuring atmospheric content. For example, the output may be only a subset of sensors measuring temperature. For example, the output may be only sensors providing audio and video data. An output of incident modeling may specify a time period for each sensor, for multiple sensors based upon sensor type and location, or for all sensors of set of sensors. Each output time period correlated to on or more sensors may form part of an instruction sent by the incident control node to instruct that sensor to provide to the incident control node, sensor data, during that time period. In other words, the incident control node may use the output of incident modeling to specify which sensors send data to the incident control node, during what time periods the provide data to the incident control node, and the specifics of the data frequency, precision, and transmission modes from the sensors to the incident control node.

The incident control node may determine nodes that link it to sensors that have, or are anticipated by modeling, to provide abnormal sensor data. The incident control node may execute programming instructing nodes forming those links to prioritize retransmission of data either transmitted from specified sensors or specified geographic regions, or data directed to the incident control node, at a higher priority than data from the sensors generating that data would normally be transmitted or re-transmitted. The incident control node may execute programming instructing the sensors or MDTU's to prioritize transmission or retransmission of data directed to the incident control node at a higher priority than data from the sensors generating that data would normally be transmitted or retransmitted. For example, in one protocol, QOS is defined by a sequence of bit, for example 16 distinct values (4 bits), and one particular sensor data is normally transmitted in frames or packets having a priority of 2. The incident control node may instruct the MDTU initially forming frames and packets for data from that sensor to specify priority 16 in the frames or packets.

For example, in one protocol, the incident control node specifies an incident severity level, for example as one of 16 distinct values (4 bits), and transmit that sequence pursuant to a fame or packet protocol reserving specified frame or packet bit locations for incident severity level, and specifies a unicast group corresponding to a group nodes forming links to MDTUs related to the abnormality, and/or MDTUs related to the abnormality. The incident control node includes both the incident severity level and unicast group in a unique packet transmitted to one or more than one other node of the IoT network, and preferably to only one other node of the IoT network.

7.2 Logical Region Abnormality

The foregoing related generally to geographic regions experiencing an abnormality. However, digital abnormalities may be defined by a logical region, such as a segment of a network, nodes programmed with particular software, whether operating system or utility software, or integrated sensors containing certain programming. Situations where particular code has been corrupted, replaced with malicious code, or malicious code has been installed, may relate to a logical region. Where logical regions correspond to a particular geographic region, the foregoing descriptions of the IoT network response apply.

Where logical regions do not correspond to a particular geographic region, the novel IoT network may be programmed to respond by implementing an incident control node selection algorithm that determines a node that does not have an identified corrupted code, replaced code, or installed malicious code, and then assigning that node as an incident control node. Preferably, the novel IoT network also determines a sequence of fallback nodes to be the incident control node, in case the existing incident control node is subsequently determined to have identified corrupted code, replaced code, or installed malicious code. That is, the identification of problematic code may evolve with time and the IoT network software may continue to determine problematic code, and need to delegate the current incident control node to not be the incident control node in case the IoT network software determines that node to be infected with problematic code.

The suitable node determination algorithm for a logical region may perform a function that limits possible suitable nodes for generating responsive instructions, to those nodes having sufficient resources to respond, based upon the number of sensors and type of sensor data of sensors indicating abnormality, to determine a set of potential responsive nodes.

The suitable node determination algorithm may calculate the number of total links required for a each node of the set of potential responsive nodes to receive sensor data from sensors providing data indicating abnormality.

The suitable node determination algorithm for a logical region may calculate the sum of geographic distance between each node of the set of potential responsive nodes indicating abnormality.

The suitable node determination algorithm for a logical region may calculate the sum of link latencies of paths from nodes providing the data indicating abnormality to each node of the set of potential responsive nodes.

The suitable node determination algorithm may compute a value for each potential responsive node, which depends upon one, more than one, or total number of links; and/or one, more than one, or all latencies; and/or estimate of potential responsive node resources, and select an incident control node based upon the output of that function.

The incident control node for a logical region abnormality may control links and priority of data communications to nodes determined to be subject to the abnormality; may control data paths through the IoT network to avoid nodes determined to be subject to the abnormality; and may receive communications from nodes determined to be subject to the abnormality and provide responsive instructions to those nodes; and may determine when nodes previously determined to be subject to the abnormality are no longer subject to the abnormality; and provide changes in network routing instructions and links and priority of data communications with those nodes once they the incident control node determines that the other node no longer subject to the abnormality.

The incident control node for a logical region abnormality may control links and priority of data communications to reroute sensor data generate by sensors and transmitted within the IoT network to avoid nodes subject to the logical abnormality and/or the logical region subject to the abnormality.

The incident control node may control links and priority of data communications by IP multicasting or broadcasting node link specifications specifying node links, node link specifications identifying network addresses or IDs of network nodes precluded from carrying network data (infected nodes), instructing data transmitted from infected nodes be deprioritized, and instructing data transmitted from non-infected nodes have priority increased.

In one embodiment, the incident control node stores a list of network addresses or IDs of nodes determined to be infected, and broadcasts that list to a plurality of other storage nodes, and the IoT network runs software on each node specifying which one or more of a plurality of storage nodes to query to determine nodes of the network that have been determined to either be infected or be not infected. Each IoT network node then implements instructions to prioritize data transmission to and from the infected and non infected nodes accordingly, and to update their local copy of infected or non-infected nodes either periodically, when instructed to do so, or in response to predetermined criteria. One such criteria might be a IP multicast of broadcast network transmission indicating the logical abnormality had been eliminated from the network. One such criterial might be a rate of increase or decrease of infected nodes for an incident. Each node might determine such a rate by comparing the number of infected nodes, or number of non infected nodes, it stores locally, as a function of time.

7.3 Combination Geographic and Logical Region Abnormality

The novel IoT network may determine a combined Geographic and Logical Region Abnormality, for example, when certain sensors and MDTUs are detrimentally affected by a disturbance related to some geographic event, such as a solar flare, forest fire, or the like which may affect both the values of sensors providing abnormal values and the logical functioning of nodes providing unstable responses due to physical damage or unintended variations in data or code stored in node memory. The novel IoT network may respond to such a determination by combining function for determining incident response nodes and responsive instructions and algorithms use for each of the geographic region abnormalities and logical region abnormalities.

8. BRIEF DESCRIPTION OF THE FIGURES

The following figures show aspects of the novel IoT networks, their structure, and their use. The figures are exemplary, only, to the extent required to comply with rule requiring drawings to illustrate embodiments of claimed elements, and are not intended to limit the novel disclosed concepts.

Figure 6:
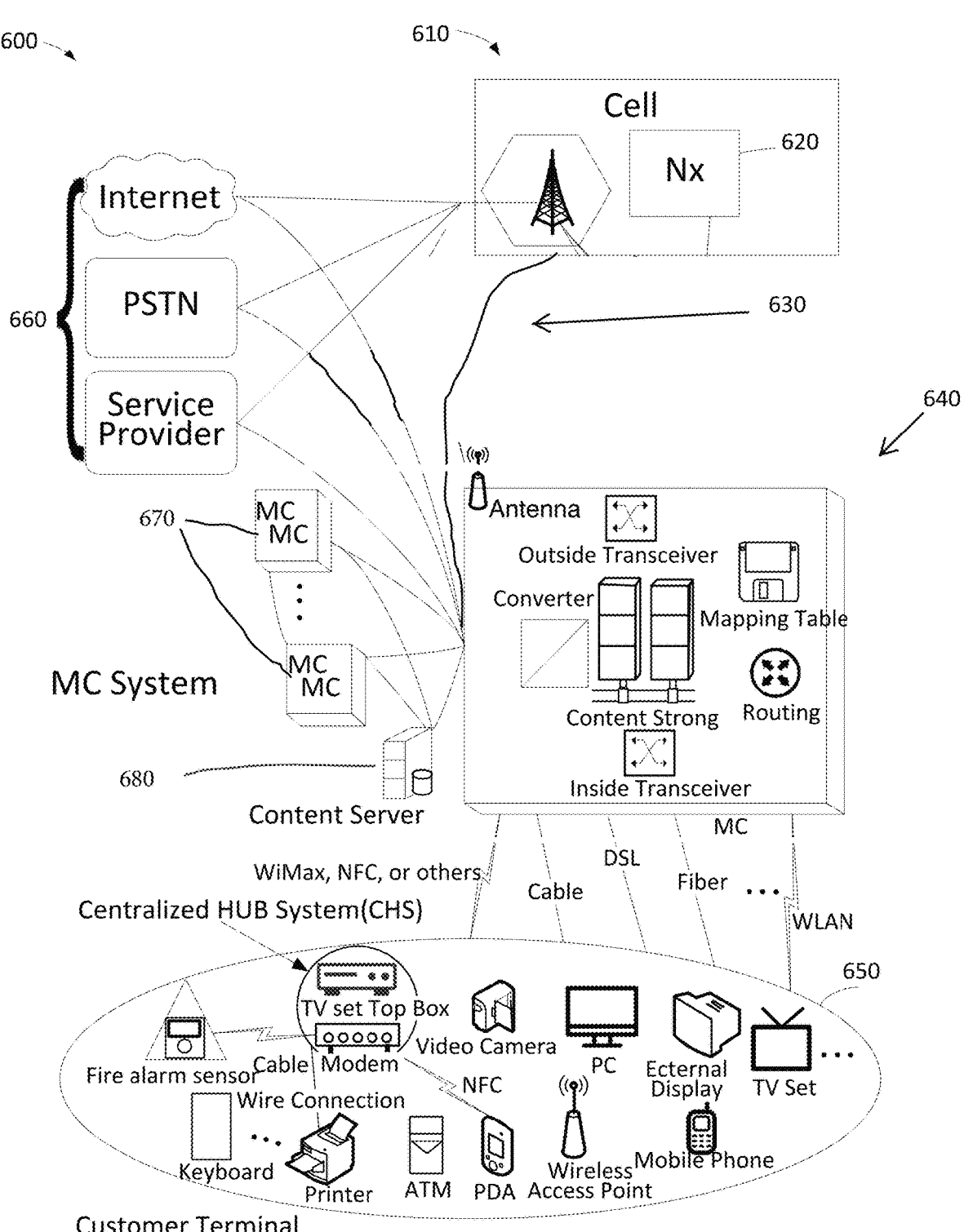

FIG. 6 shows another schematic illustrating a novel configurable IoT Network 600, including an MC System and a CHS, as generally described in U.S. Pat. No. 9,912,983, which is incorporated herein by reference.

Figure 7:
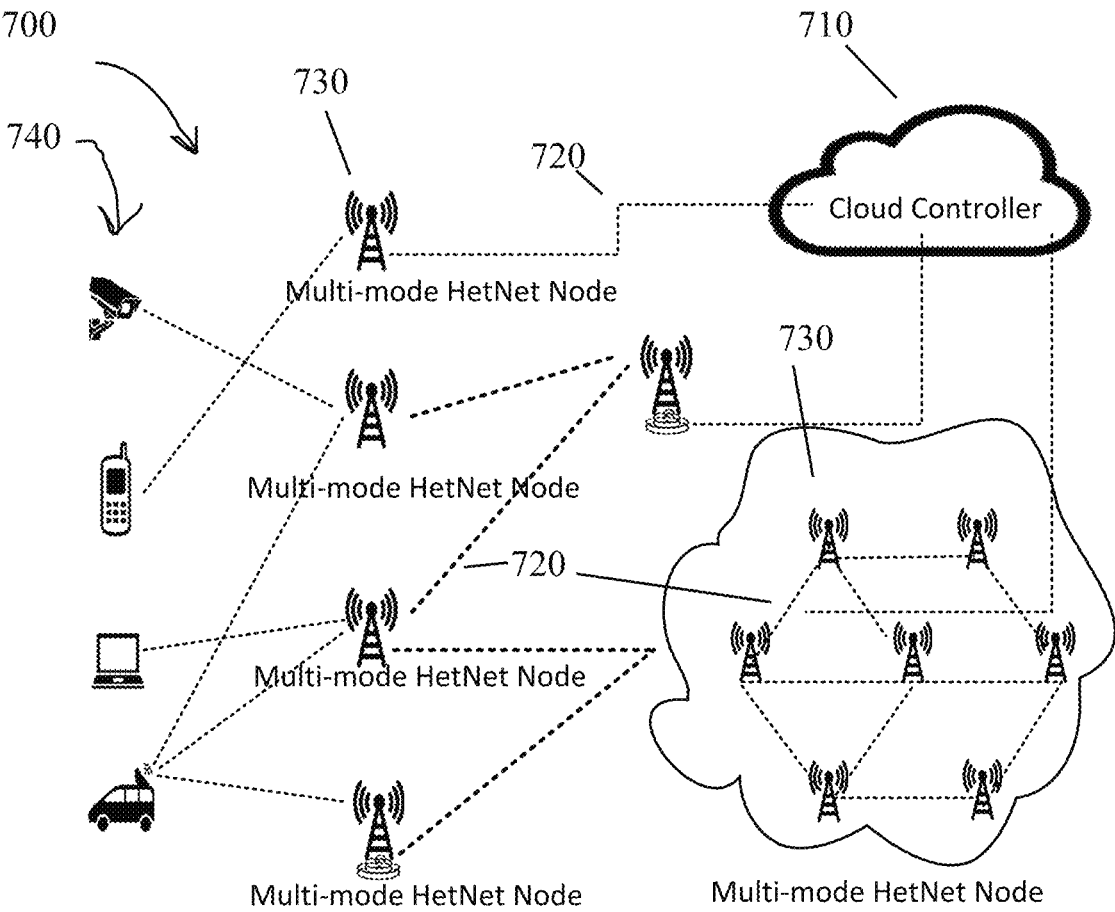

FIG. 7 is a schematic showing an IoT network 700 comprising a cloud controller 710 for controlling an IoT network.

Figure 8:
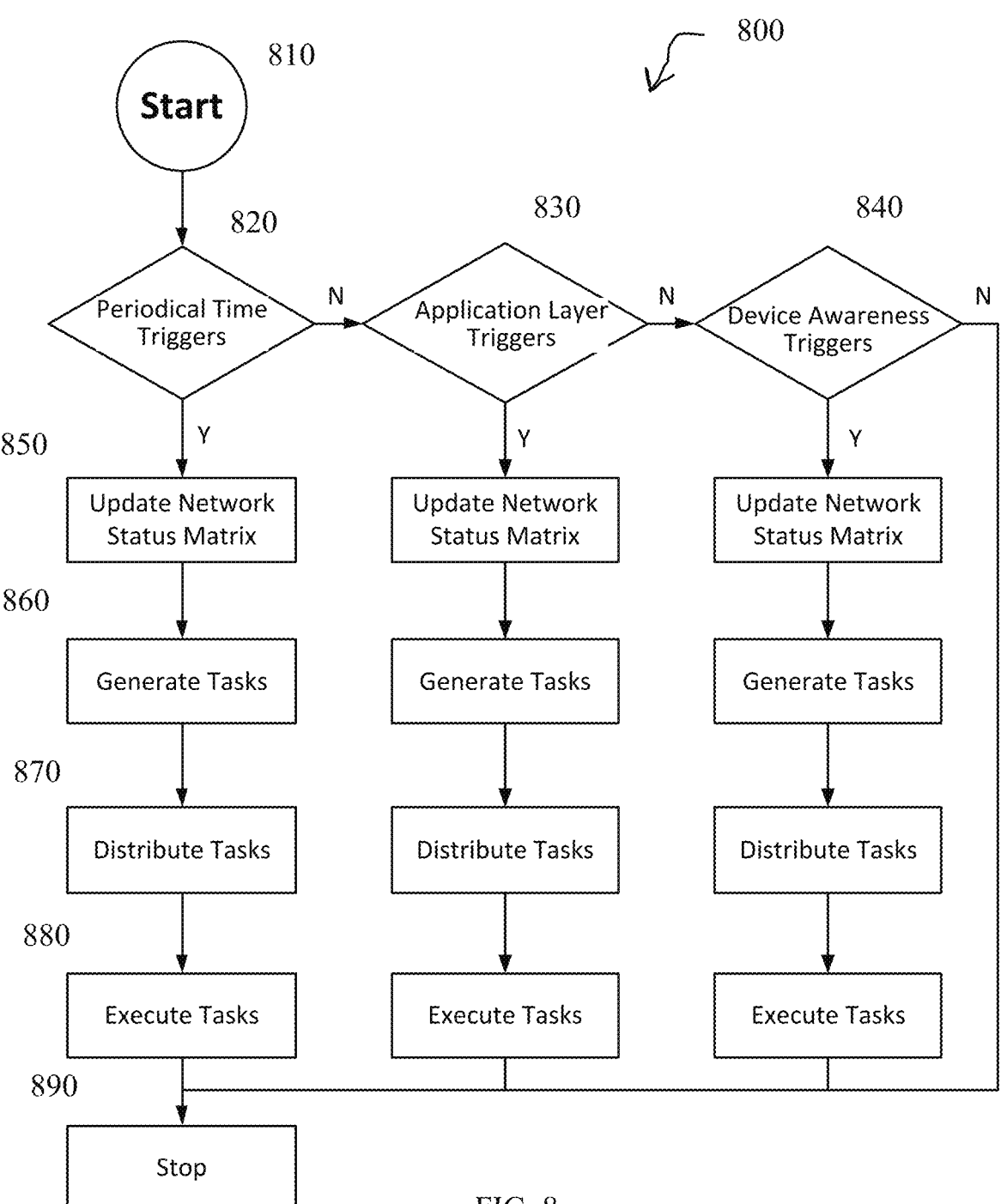

FIG. 8 is a high level flow chart showing flow of functions performed by cloud controller 710 of IoT network 700.

Figure 1:
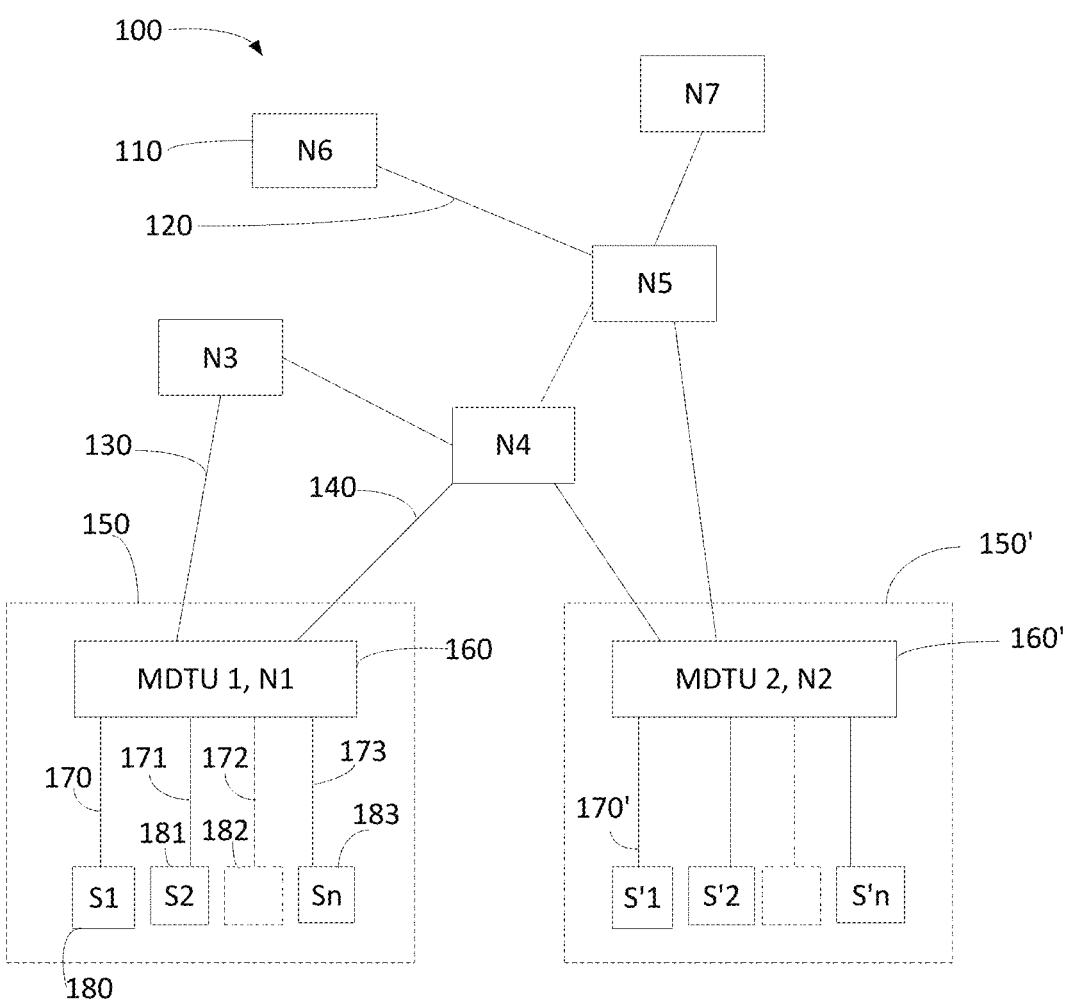
FIG. 1 shows a schematic of a novel IoT network 100.
Figure 9:
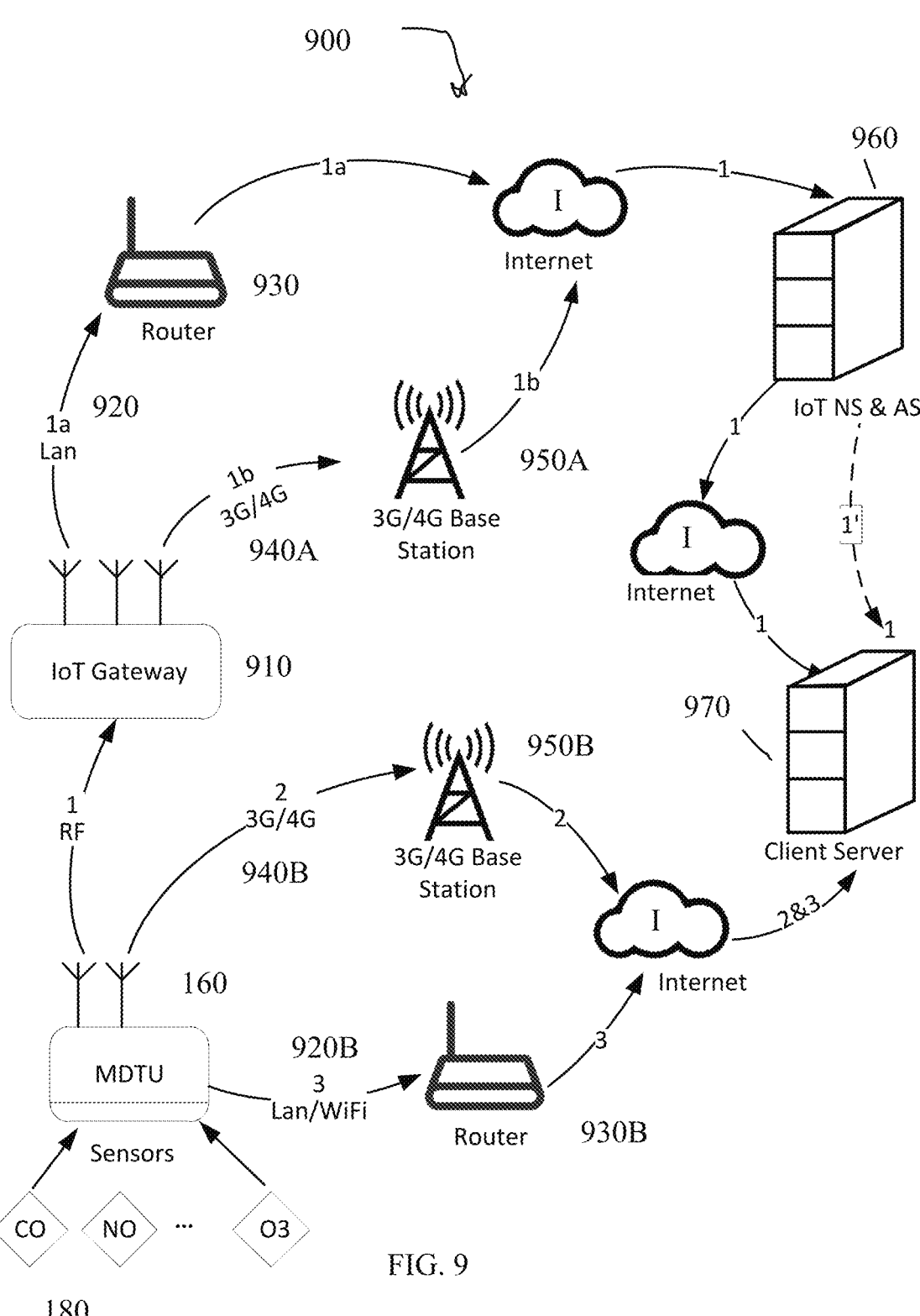

FIG. 9 is network schematic 900 showing communication links between sensors, an MDTU of FIG. 1, and network interfaces.

Figure 10:
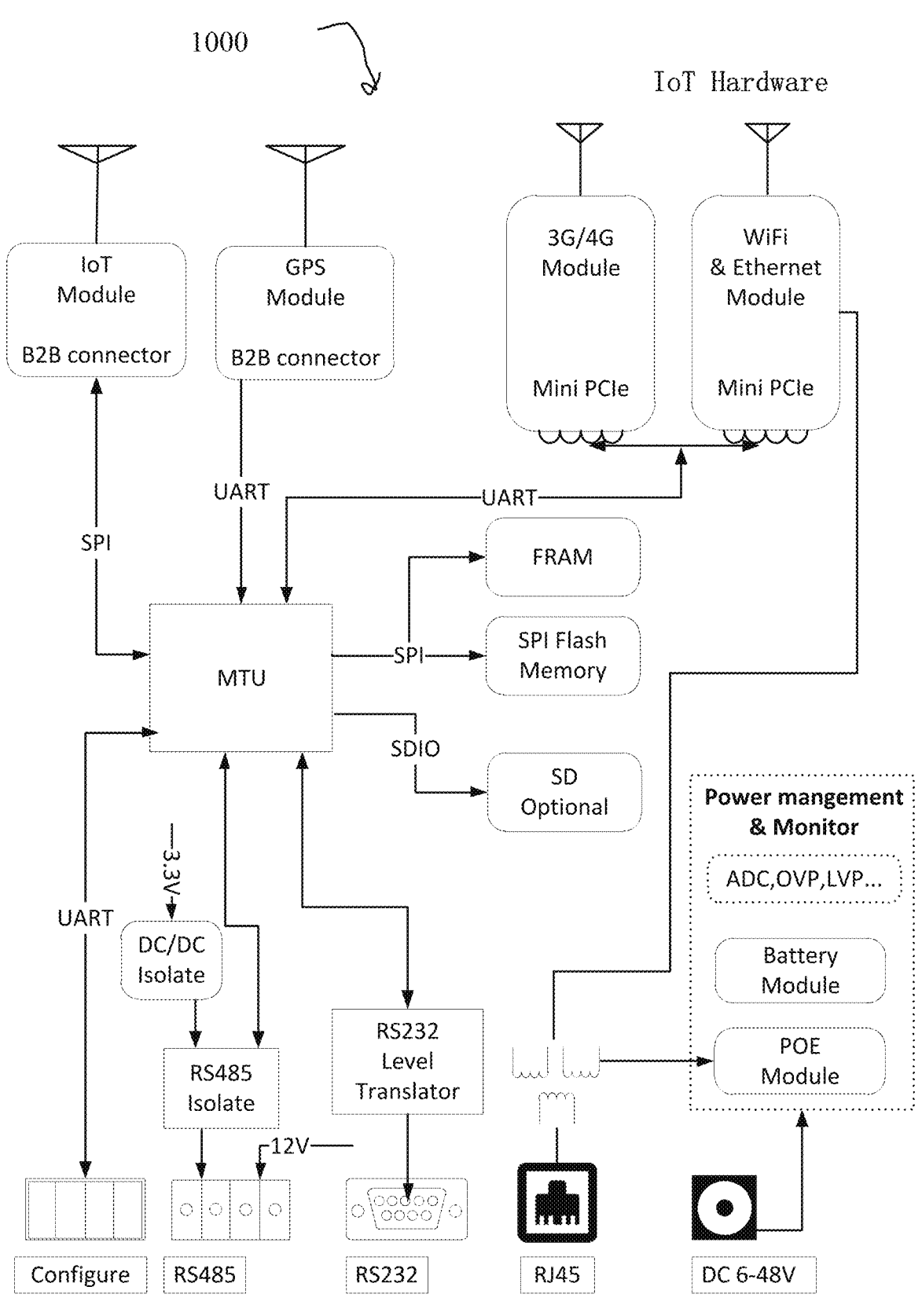

FIG. 10 is a schematic 1000 of components of one embodiment of an MDTU of FIG. 1.

Figure 11:
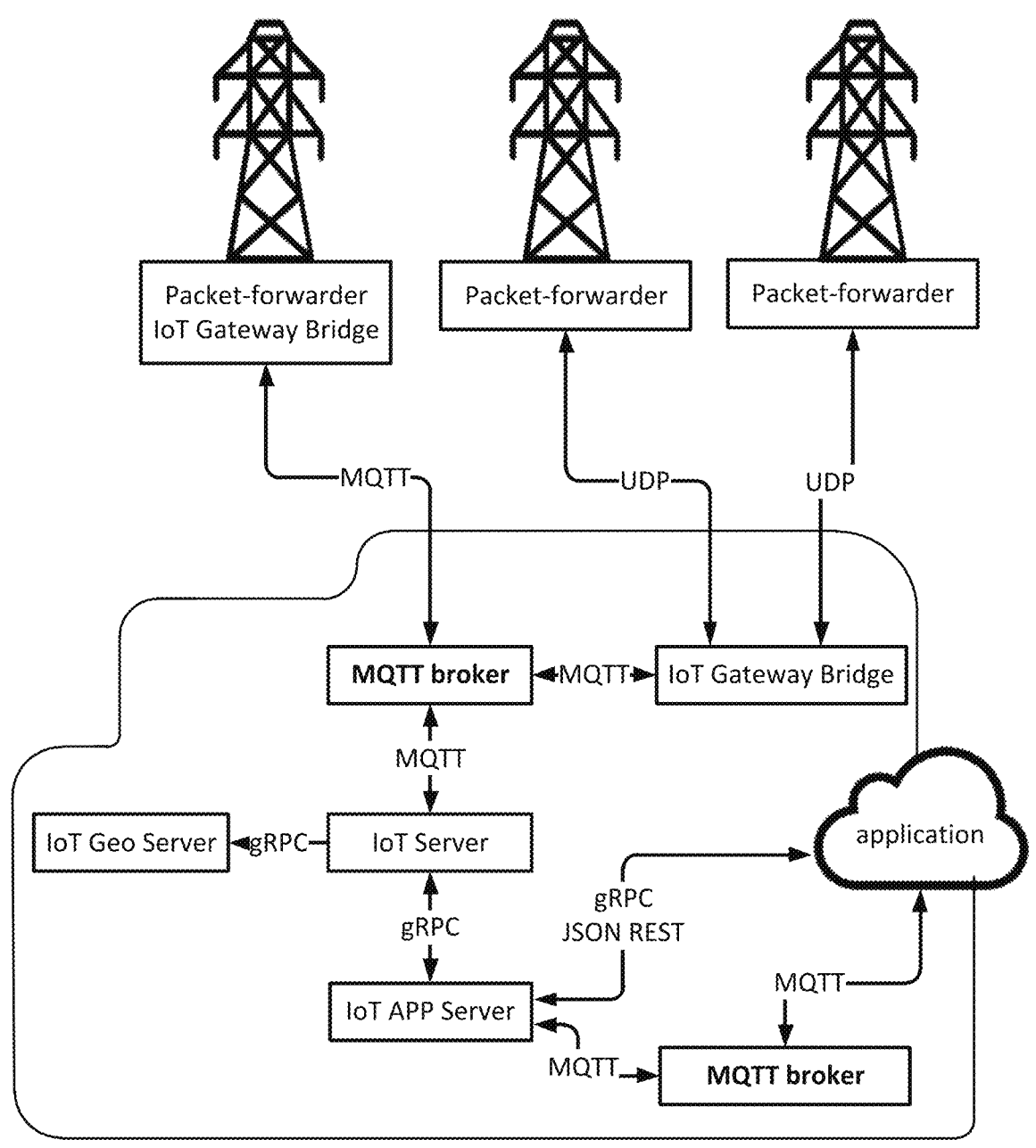

FIG. 11 is a schematic 1100 of an agent (either a Network Edge agent or a Device Agent) communicating with an IoT network.

9. DETAILED DESCRIPTION OF EMBODIMENTS

Detailed Description of Embodiments

FIG. 1 shows novel IoT network 100. Network 100 is shown comprising nodes N1 to N7. Node 100, N6, is connected to Node 5, by link 120. Node N3 is connected to Node N1, that is element 1060, by link 130. Node N4 is connected to Node N1, by link 140. Element 160 is node N1, which is also an MDTU, identified as MDTU1. MDTU1 communicates with a plurality of sensors, S1, S2 to Sn (n representing an integer), numbered 180, 182, 183, and 183, by communication and/or control lines numbered 170, 171, 172, and 173. Communication and/or control line 172 and sensor 182 are shown in dashed lines indicating they may represent a plurality of sensors communicating data to node 160. FIG. 1 shows dashed box 150 representing are relatively localized region of space surrounding node 160 that contains sensors S1 to Sn, indicating that sensor data originating in the IoT network from sensors communicating with node 160 originates in the vicinity of node 160, for example within a 10 kilometers of node 160, for example within 1 kilometer of node 160, and for example within 100 meters of node 160.

FIG. 1 shows element 160' is a node and an MDTU identified as N2 and MDTU2 and has an associated vicinity 160'. Node 160 also has associated sensors S1' to Sn' and sensor communication and/or control lines 170'. FIG. 1 also shows node 160 having links to two other nodes, nodes N4 and N5.

Figure 2:
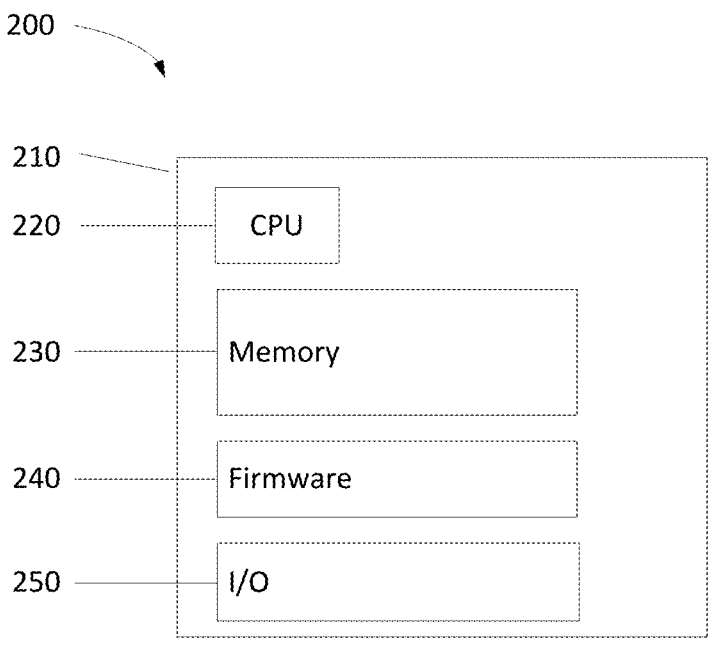
FIG. 2 shows a schematic of N6, node 110, of the novel IoT network.

FIG. 2 shows node 200 comprising a casing 210, CPU 220, memory 230, firmware 240, and I/O 250. The casing is optional. The memory may be organized in various forms including logical drives and conventionally addressable random access memory. Not shown are conventional hardware elements including data bus's, power supply and the like. Also not shown are contents of memory including a local operating system, code necessary for network operations in addition to operating system, system configuration data, and utility software code. The I/O represents the ability to communicate with other nodes including for example a network interface and storage of corresponding protocols.

Figure 3:
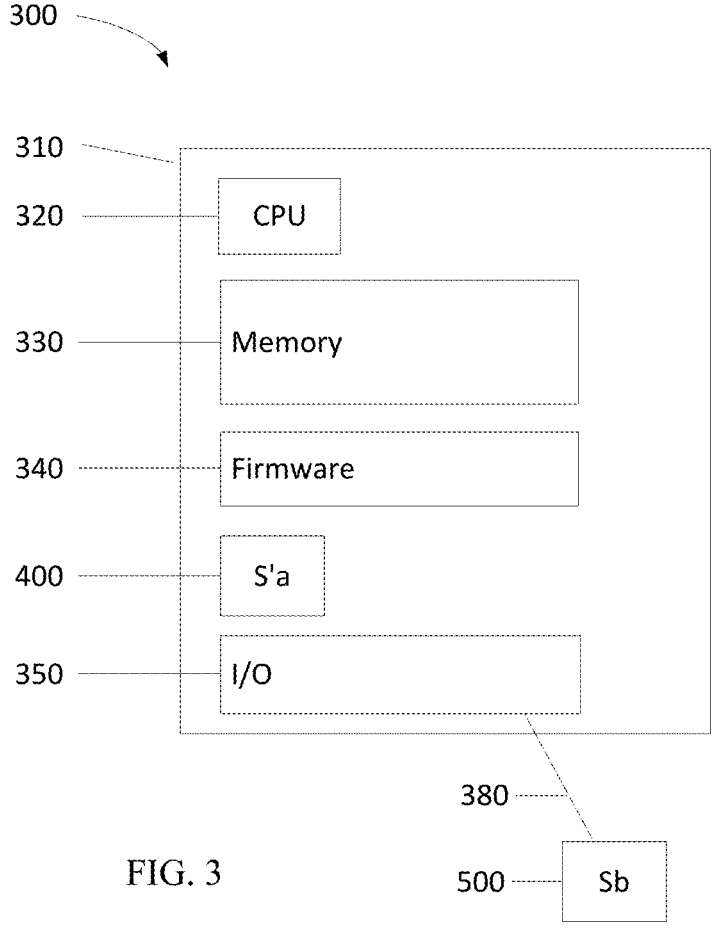
FIG. 3 shows a schematic of a node MDTU1, or N1, of FIG. 1 that is an MDTU, and associated sensors.

FIG. 3 shows MDTU node 300 including casing 310, CPU 320, memory 330, firmware 340, and I/O 350 as described for elements of FIG. 2.

FIG. 3 also shows dumb sensor 400 (Sa) within casing 310 and integrated sensor 500 (Sb) communicating with node 160 via link 380. FIG. 3 illustrates configuration of an MDTU of network 100 receiving sensor data from both an internal dumb sensor and an integrated sensor.

Figure 4:
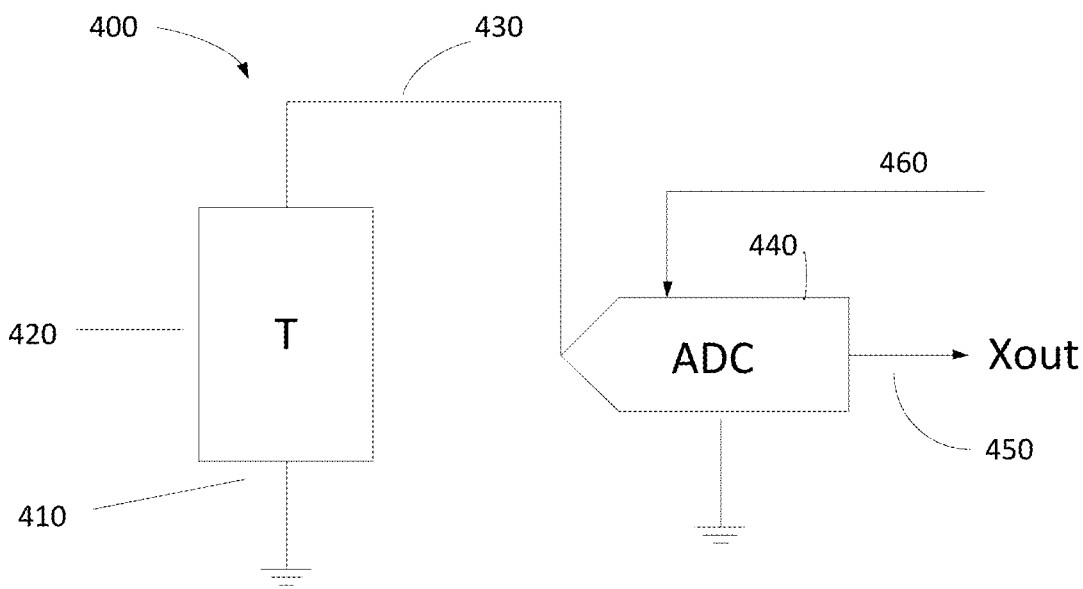
FIG. 4 shows a schematic of an associated dumb sensor of FIG. 3.

FIG. 4 shows dumb sensor 400 comprising ground connection 410, physical property transducer 420, conductive line 430. Conductive line 430 outputs a voltage to input of ADC 440. ADC 440 outputs digitally sampled data 450 (Xout). ADC 440's sampling parameters (such as precision and sampling rate) may be controlled by signals received from control line 460.

Figure 5:
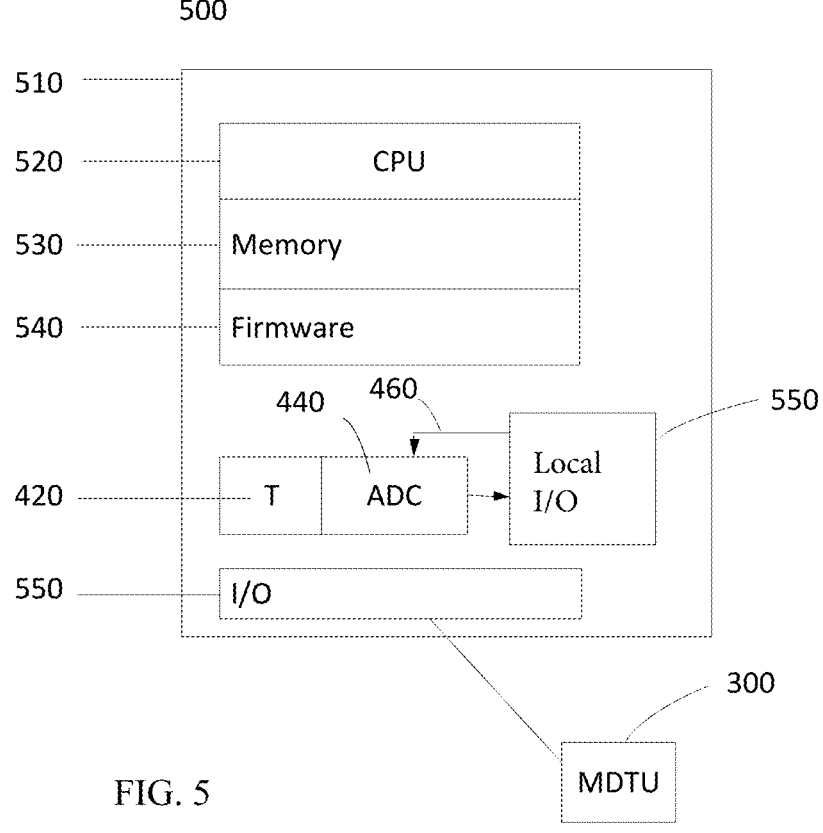
FIG. 5 shows a schematic of an associated integrated sensor of FIG. 3.

FIG. 5 shows integrated sensor 500 comprising a casing 510 enclosing CPU 510, memory 520, firmware 540, and I/O 550, similar to elements of FIG. 2. FIG. 5 also show integrated sensor 500 comprising a dumb sensor (transducer 420, ADC 440, and control line 46) communicating with local I/O 550. Local I/O received sampled data output from ADC 440 and optionally provides control signals to the dumb sensor on line 460. For clarity, FIG. 5 shows MDTU 300 to illustrate that I/O 550 communicates with an MDTU.

FIG. 6 is a schematic illustrating a dynamically configurable IoT 600 comprising a CHS and an MC system. FIG. 6 shows cellular network 610; node Nx, that is node 620 of cellular network 610; MC system 640 and links 630 from MC system 640 to networks 660 (comprising the Internet, PSTNs, and service provider networks), to cellular network 610, and to other MC systems 670; CHS 650; and content server 680.

As shown, MC system 640 may comprise: an inside transceiver; a routing module; a mapping table; an outside transceiver; a content strong; a converter; and one or more antenna.

As shown, MC system 640 may have links to WiMax, NFC, Cable, DSL, Fiber, WLAN or other transmission media and standards of CHS 650. MC system 640 may optionally include content server 680.

As shown, CHS 650 may comprise a customer terminal, a keyboard, a printer, a fire alarm, a modem, a TV set top box, a video camera, an ATM, a PDA, a PC, a wireless access point, a mobile phone, an External display, a TV set. CHS 650 may comprise other devices.

CHS 650 may comprise an MDTU, that is a network node having sensors. MC system 640 may also comprise an MDTU, that is a network node having sensors.

The MC System 640 functionality includes receipt, conversion and transmission of content in two directions. MC System 640 includes facilities for mapping and routing content to various connected devices and data storage for storing content that is served locally or to remote devices. Receiving, converting and transmitting multimedia content may be performed in two directions using the MC System 640. For example, this may include receiving and transmitting signals from one or more of the cellular networks, the Internet, the PSTNs, and the service provider networks 660, other Management Centers, as well as receiving and transmitting signals from user terminals including televisions, monitors. A variety of sensor monitoring is also implemented, including diaper monitoring, video camera, fire alarm, theft sensor, etc.

The MC System 640 also includes a converter module with routines for selecting, extracting, compressing, decompressing, adjusting data, and converting the data format and/or power level and/or data package size/format.

The MC System 640 also includes a mapping table and a routing module. The mapping table is described further below. It matches phone numbers, cable ports, DSL ports, IP addresses, etc. The routing module is for routing data to destinations through designated channels. The routing module accommodates routing the received data that is inbound from a variety of sources including but not limited to cable, broadcast television and Internet. It also accommodates routing to a variety of interfaces found on receiving terminals, including but not limited to RS232, USB (any versions of the specification for USB), and video cable port. The routing module receives the relevant information concerning routing from the results of looking up the same in the mapping table, and carries out the routing accordingly. The mapping table and routing module also include information and program code for carrying out the dynamic configuration of the IoT network.

The MC System 640 also includes data storage, such as a spinning or solid state hard disk. This allows the MC System 640 to store content to assist faster and more efficient data receiving and transmission to user terminals. The MC System 640 may also conveniently retains converted content (e.g., compressed, coded, decrypted, decompressed) for subsequent additional access. This converted content may be provided internally or transmitted externally from MC System 640.

When a communication is inbound to the MC System 640, it may include a data package that identifies the destination device. This may be in the form of a unique device identifier that is associated with each device managed by MC System 640. The mapping table is queried for the presence of the unique identifier. Once this is successfully performed, corresponding information regarding the processing of the communication may be automatically gathered from the mapping table. The information in the data package is also connected to the IoT network dynamic configuration. Thus, for example, changes in sensor data may be associated with updates for destination devices and/or routing requirements.

Additionally, or alternatively, MC System 640 (and/or CHS 650) can obtain formatting, addressing, and other information by referencing portions of the received data package according to a predefined protocol. For example, information within the received data package may indicate the format (e.g., TCP package in Internet) for transmission and the format (e.g., data package defined by WCDMA standard in 3G) for receiving, as well as the destination address corresponding to the converted data format. The overhead information within the received data package can inform the MC/CHS regarding the next transmission protocol and matched format. That is, the data package received by the MC/CHS includes some defined extra data besides the desired content data. This information informs the MC/CHS regarding the inbound data format transmission protocol, and also the outbound data format and the transmission protocol corresponding to the data format.

There may also be network-based connections, such as to a PC (or home LAN router) or directly to a television equipped with a network interface card and related functionality. In these instances the address information (and corresponding entries in the mapping table) would include the network address of the particular device. MC System 640 is equipped with its own network interface card and corresponding output to engage in these communications. These and other communications such as to a cellular phone via either the use of the cell phone number or a direct local wireless communication may be made, again as indicated in the mapping table. These communications are also dynamically configurable to provide or participate in the dynamically configurable IoT network according updates in the sensor data, etc.

There may also be situations where multiple different processes and corresponding conversion and addressing need to be applied for a given device. For example, a television set may be connected to both a network connection and the video output of MC System 640. As another example, a cellular phone may have alternative communication capabilities as noted. In these circumstances, the mapping table may also include multiple different entries designating the address, signal format, etc. In this fashion, the IoT network accommodates updates to communication and addressing according to changes and updates in different situations.

Category codes includes in the mapping table information may be used to efficiently sort different forms of processing that depend upon conditions (e.g., based upon sensor data). Thus, for example, a processing category code #1 may be a low level priority while sensor data is relatively benign (e.g., no fire), whereas processing category code #2 may provide a higher level of priority and different communication pathways and requirements for emergency situations (e.g., possible fire detected, possible unauthorized entry, power outage, etc.) The processing category code may (like the device identifier) be a number that is included in the data package.

The data package may also be variously provided to MC System 640. In one embodiment, the data package may be contained in a header area in packet data sent to MC System 640 by the source. Still further, at times the data package may itself contain information used in converting and/or addressing the appropriate device. For example, the data package itself may contain the network address of the destination device in lieu of looking for the same in the mapping table. As another example, all or part of key information for decrypting content may also be provided in the data package. As still another example, the data package may contain a flag to track an indication as to whether a virus screening process has completed successfully.

Devices that are intended to work with MC System 640 may also be equipped with software and/or hardware that allows them to insert and deliver the appropriate information in communications with MC System 640. For example, a cellular phone may be equipped with software that provides the appropriately configured data package in initiating communications with MC System 640 and/or configuring MC System 640 to provide any of the dynamic IoT network features described herein.

MC System 640 variously processes data depending upon corresponding devices and purposes for the data. For example, the data received from cellular networks are selected and then converted to be displayed on home or office appliances with different types of display screens. Similarly, some content can be displayed more properly by mobile phone displays.

In addition, some data are also compressed and re-organized at MC System 640 so that they have certain data package sizes and formats for matching the requirements of the relevant transmission networks. For example, the signals sent from a wet diaper, fire alarm, and/or theft sensor may be transmitted to a user's cell phone or 911 Center. Additionally, either these signals or the corresponding routing condition of information related to them is updated depending upon the sensor data. This information may be compressed before transmission over the wireless network, which allows increased efficiency when using the wireless communication channel Additionally, security and encryption protocols (e.g., SSL) and error prevention protocols and coding schemes (e.g., Huffman, Solomon, or Turbo LDPC coding) may be applied to ensure that the information that is transmitted remains secure and without error.

The dynamically reconfigurable IoT network also applies to home appliances. The home appliances (e.g., TV set, PC, Handset, Printer, PALM, camera, Headset, game controller, refrigerator, etc.) may also function through the (CHS), as illustrated. CHS 650 communicates with MC System 640 and/or Internet and/or other networks. CHS 650 can also be built into a cable modem, TV set top box, or other device. The sensor signals, for example, from a wet diaper, fire alarm, or theft sensor can also be sent from the CHS. Finally, it is noted that CHS 650 may perform the functions described for MC System 640.

The commonly practiced wireless connection centralized by wireless access point is based on WLAN technology, which is IP-oriented technology. Since the IP addresses may exhaust over time, each consumer electronics item such as headset, game controller, etc. configured to have an IP address is costly and fails to serve the user's needs well. One or more embodiments of the present invention offer two aspects in this regard. First, an intelligent management system centered by traditional connection equipment, such as TV set top box, cable modem, DSL modem or the like unites, manages, and optimizes the consumer electronics' functions. Also provided is a non-IP based wireless connection among these consumer electronics devices.

As shown in FIG. 6, CHS 650 communicates with the Internet through ADSL or cable and cellular base stations through wireless connection. The consumer electronics items communicate with CHS 650 through wireless channels such as Bluetooth, UWB, NFC or wire line connection. CHS 650 is the center of this wireless communication system.

A handset (e.g., cellular phone) can receive Internet data through CHS 650 and/or MS instead of communicating with a cellular base station. This communication channel is more reliable, less costly, and offers improved bandwidth compared to conventional connections between base station and the cellular phone.

There may be a corresponding connection between CHS 650 and the cellular network. This may implement a traditional wireless connection between CHS 650 and a cellular base station, with the communications implementing conventional wireless communications protocols. Another possibility is a leased line or wireless line connecting CHS 650 to the core cellular network. CHS 650 preferably includes a WiFi router function as well as the ability to route addresses between IP and cellular telephone number. It also is able to report to the cellular network with regard to the location of a particular user, so that information designated for that particular user may be directed to CHS 650 accordingly (e.g., calls, content ordered by particular user via cellular phone, etc.). It also may include any necessary conversion functions. In addition to reporting the location of a user to the cellular network, MC System 640 (or CHS) may also report roaming information to other MC Systems (or other CHS). This allows subsequent communications between users without involving the cellular network. That is, a first user may be located in the covered area for a first MC System, and a second user may be located in the covered area of a second MC System. While this circumstance remains, communications between the first and second users via their mobile terminals may involve the wireless connections from the MC Systems (as well as the connection between MC Systems, which may, for example, be an IP connection).

In addition, the information sent to the cellular phone can be delivered to a TV for a better display in accordance with another aspect of the present invention. Furthermore, the communication between CHS 650 and an oven with sensors and corresponding conditions can be variously triggered, such as through the detection of boiling water or the temperature of the food in an oven. A signal to arouse the attention of whomever is cooking the food or boiling water is transmitted to the TV, acoustic system, cellular phone, computer, beeper, mobile terminal, PDA, etc.

Various sensor data may prompt corresponding communications. For example, a wetness sensor in a child's diaper may prompt when wetness is detected. Corresponding signals will be delivered to TV, cellular, day care center, etc. Similarly, fire alarms, entry alarms, power outage alarms and other prompt communications that may be dynamically configured and update according to all the contributing sensor data.

A variety of data transmission protocols may be used to transmit multimedia content to MC System 640, including from cellular networks (e.g., 3G), Internet, Service Providers, and from other MC Systems.

A set of transmitter(s) and/or receiver(s) for connection with external resources is equipped at MC System 640. The connection channels for data transmission may include wired line connections (e.g., DSL, Fiber, Cable, DSL, least line, etc.) between MC System 640 and outside networks (e.g., Cellular Network, Internet, Service Provider networks). Additionally, wireless connections (e.g., WiMax, Satellite communications (e.g., VSAT system), traditional communications with cellular base stations, point-to-point or point-to-multipoint wireless connections) may provide the connection between MC System 640 and outside networks. MC Systems may also connect, communicate, route, and relay content among and between each other. The connections among MC Systems are structured by efficient data transmission, service requirement, cost, bandwidth and other resources availability, and the relationships with Internet Content Servers, Cellular Networks, local Service Providers, and other MC Systems.

A variety of communications may also be applied for the communication channels between MC System 640 and the various local user terminals. At the user terminal side, the users use TV, computer, DSL modem, Cable modem, WLAN access point, mobile terminals, and various sensors that communicate with MC System 640.

A set of transmitter(s) and/or receiver(s) are equipped for the data transmission between MC System 640 and user terminals. Communication channels between MC System 640 and user terminals include the following: (1) direct connection using the available transmission port/standard such as USB, RS232, TV cable, Ethernet, Telephone line, etc.; (2) Wireless Personal Area Network such as UWB, Bluetooth, WLAN, etc.; (3) Long-range wireless connections such as WiMax, Satellite, e.g., VSAT, TV broadcast, etc.; or (4) Wire-line connection such as DSL, Cable, Ethernet, etc.

The data transmission between an MC System 640 and user terminals can be one-way or two-way. One-way data transmission includes data sent from MC System 640 to the user terminals and the data sent to MC System 640 from user terminals. For example, MC System 640 sends data to user terminals (e.g., advertisement broadcast to TVs, computers, mobile terminals, etc.). Similarly, the user terminals send data to MC System 640 (e.g., signals sent from a fire alarm to an MC System.). The data transmitted between an MC System 640 and a user terminal is preferably bidirectional. In this circumstance, transmitter and receiver at both sides are equipped.

The operations on data processing and transmission at an MC System 640 can be shared with a plurality of user terminals and/or other MC Systems. In some circumstances, some functions of MC System 640 described above can be done by a user terminal so MC System 640 is omitted. One aspect of the invention is a TV or other display that is equipped to receive RF signals sent from cellular base stations. The cellular television demodulates, and/or compresses/decompresses data, and/or converts the signals to the appropriate format before displaying the image/video. The conversion and transmission provided with the television can also be two-way. The cellular television with a video camera/microphone can also record and extract the multimedia information, which can be transmitted to other users' terminals through cellular network or Internet. The cellular television is equipped to extract and/or convert, and/or compress, and modulate the multimedia information before sending it to the cellular base station. The cellular television also preferably has a separate channel for displaying multimedia information from the cellular network or other networks beyond traditional TV programs. Users may also use the TV remote controller to dial telephone numbers like a telephone dial panel.

Referring again to FIG. 1, an MDTU may be embodied as a group of sensors, for example corresponding to the fire alarm sensor of CHS 650. Alternatively, an MDTU may be embodied within other components, such as MC System 640 and/or CHS 650. Examples of these implementations of an MDTU are illustrated in MC System 640 and the local environment of CHS 650, as illustrated in FIG. 6.

FIG. 7 shows IoT network 700 comprising a cloud controller 710 for controlling an IoT network. FIG. 7 also shows links 720 (dashed lines); nodes 730 (Multi-mode HetNet Nodes); and IoT devices 740 (graphically indicated as video recorder, mobile phone, PC, and automobile). FIG. 7 distinguishes between nodes 730 linked to an IoT device 740, identifying those nodes with End Terminal Device Agents, and nodes 730 not linked to an IoT device 740, identifying those nodes with Network Edge Agents.

A Network Edge Agent is built-in as firmware of wireless network equipment, i.e. base station, gateway, repeater, etc. Network Edge Agent receives and implements policies and tasks sent from the Cloud Controller. Network Edge Agent works closely with radio-related functions thus may dynamically change radio parameters i.e. Tx Power, Central Frequency, Bandwidth, Frame Configuration, RF Mode, etc.

A Device Agent is built-in as firmware of IoT devices. It receives and implements policies and tasks sent from the Cloud Controller and Network Edge Agent, thus it may change the device's RF behavior dynamically according to the policies or tasks received from upper layer.

Heterogeneous networks (HetNet) is a term used for modern mobile communications networks. A modern mobile communications network is comprised of a combination of different cell types and different access technologies.

Multi-mode HetNet Node refers multiple types of HetNet-capable wireless base stations, including Macro cells that are used to provide coverage. Pico cells and micro cells that are used to enhance capacity in busy areas, such as train stations, shopping malls and city centers. Femto cells and Wi-Fi that are used at the office and at home. Deployment of these small cell are a key feature of the HetNet approach as they allow considerable flexibility as to where they are positioned.

Multi-mode HetNet Mesh is composed of a cluster of wireless-mesh-capable Multi-mode HetNet Nodes.

Cloud controller 710 preferably controls network 700 to improve spectral efficiency, resource utilization rate, and real-time ability. Spectral efficiency, spectrum efficiency or bandwidth efficiency refers to the information rate that can be transmitted over a given bandwidth in a specific communication system. It is a measure of how efficiently a limited frequency spectrum is utilized by the physical layer protocol, and sometimes by the media access control.

Resource utilization rate is defined as the amount of a wireless channel's available frames that can be allocated for data payload transfer, divided by theoretical maximum scheduled frames in given time slot, expressed as a percentage.

Real-time ability means the latency between transfer and receiver (usually measures as a number in microseconds).

Cloud Controller 710 is a centralized network management entity, including at least one digital processor, memory, I/O, an operating system, and other software or firmware.

Cloud Controller 710 determines some or all of the parameters defining each link in the IoT network (a link is also referred to herein as a connection), including RAT (radio access technology), allocated bandwidth, QoS, scheduling priority, data routes, etc. in charge of all network management functions. Cloud Controller 710 semi-continuously updates network elements with management message and signaling. For example, communicating with the rest of the network during every second, and typically sending or receiving instructions during most millisecond intervals.

Cloud Controller 710 sends upper layer service requests (also known as distributing policies and computing tasks) to network equipment and devices, such as nodes 730 and IoT devices 740.

For example cloud controller 710 implements software that controls network configurations to send to the nodes 730 and IoT devices 740, which in part specifies to nodes 730 and IoT devices which devices to form or terminate links 720. For example, software that cloud controller 710 implements may determine which ones of nodes 720 implementing end terminal device agents connect to which ones of IoT devices 740. This determination may be based for example upon location information for IoT devices 740, IoT bandwidth requirement information (indicating how much bandwidth is desired) from IoT devices 740; and node bandwidth requirement information (indicating how much bandwidth is desired) from nodes 730. Cloud controller 710 may for example determine to send instructions to specified nodes 730 to make or brake links with specified IoT devices 740, to minimize link distance, to reduce bandwidth load on specified nodes 730, or to decrease latency of signal transmission from specified IoT devices or specified types of data from an IoT device, to a network node 730 or to cloud controller 710.

In one mode of action, cloud controller 710 detects and evaluate network status periodically, such as every millisecond, second, every minute, or every hour, based upon timing triggers. When a timer triggers, cloud controller 710 may calculate network status and update a network status matrix containing information defining the status of the network. Cloud Controller 710 may generate tasks (including Power Adjustment, Frequency, Channel Bandwidth, Coding Scheme, Modulation, Target BLER, Required QoS, Target Latency, etc.) based upon the contents of network status matrix. Cloud Controller 710 may distribute the generated tasks to the network edge (that is to Multi-mode Heterogeneous Base Stations). The Network Edge Agent may implement changes according to the received tasks. The Network Edge Agent may distribute changes to Device Agent if the task calls for changes at device side. The nodes running the Network Edge Agent and optionally the IoT devices running the Device Agent implement changes and tasks specified by the instructions originated by Cloud Controller 710.

In one mode of action, cloud controller 710 detects an order from application layer that requires the network to allocate resource dynamically. For example, a video emergency call is to make from a bandwidth-limited multi-radio access technology. Cloud controller 710 may calculate network status and update the network status matrix. Cloud Controller 710 generate tasks (including Power Adjustment, Frequency, Channel Bandwidth, Coding Scheme, Modulation, Target BLER, Required QoS, Target Latency, etc.) to address and prioritize the emergency video call. Cloud Controller 710 may distribute the tasks to a network edge (that is, to a suitable Multi-mode Heterogeneous Base Station that can communicate with the sender of the emergency call.) That Network Edge Agent running on the Multi-mode Heterogeneous Base Station implements changes according to the received tasks. That Network Edge Agent may distribute changes to the Device Agent (running on the video emergency caller's video calling device) if the task calls for changes at device side.

In one mode of action, cloud controller 710 detects changes in device behavior and recognize changes should be made due to certain devices call for network resource. For example, cloud controller 710 may receive network information indicating a surge of activated devices above some threshold number or factor. Cloud controller 710 may run software that indicates from the surge in activated devices that the network is going to be required to admit mass connections in a very short coming slot. Note that a device typically has status of either active mode or inactive mode. In active mode, a device is online and likely in the process of transferring or receiving data to or from network nodes. In inactive mode, the device has no data to transfer or receive. Cloud Controller 710 may calculate network status and update the network status matrix. Cloud controller 710 may generate tasks (including Power Adjustment, Frequency, Channel Bandwidth, Coding Scheme, Modulation, Target Block Error Rate (BLER), Required QoS, Target Latency, etc.) Cloud controller 710 may distribute the tasks to network edge (that is Multi-mode Heterogeneous Base Stations). The corresponding Network Edge Agents in the Base Stations implement changes according to the received tasks. The corresponding Network Edge Agents distribute changes to Device Agents (of the device with which they are communicating respectively) if the task calls for changes at device side.

The network status matrix stores data elements including: application requirements for applications run on IoT nodes and devices; distance between pairs of IoT nodes; power consumption requirement of IoT devices; QoS (the quality of service) requirements for communication protocols and applications; data rate requirements; bandwidth requirements; payload form including size of the package and coding scheme; latency of data paths; fault information for nodes; failure or disconnection data for links between pairs of nodes; and other factors that may relate to decisional processing executed by Cloud controller 710 to improve spectral efficiency, resource utilization, and real-time ability.

FIG. 8 is a high level flow chart 800 showing flow of functions performed by cloud controller 710 and controlled elements in IoT network 700.

FIG. 8 show start 810, periodical time triggers 820, application layer triggers 830, device awareness triggers 840, update network status matrix 850, generate tasks 860, distribute tasks 870, execute tasks 880, and stop 890.

If a periodic time trigger exists, at 820, cloud controller 710 initiates execution of the left column of steps 850 to 890. Cloud controller 710 updates a network status matrix 850 based upon data received from the network components in 850, executes code to generate tasks 860 and based at least in part on network status, and to distribute tasks 870 to network components based at least in part network status, and cloud controller 710, nodes 730, and/or IoT devices 740 execute those tasks, at step 880.

If there is no periodic time trigger, at 820, cloud controller 710 determines if application layer triggers exist, at step 830. If yes, cloud controller 710 and the other network components execute steps 850 to 880 as just described for periodic time triggers, but for the application layer triggers.

If there no application layer triggers exist, at step 830, cloud controller 710 determines if device awareness triggers exist, at step 840. If yes, cloud controller 710 and the other network components execute steps 850 to 880 as just described for periodic time triggers, but for the device awareness triggers.

FIG. 9 shows network schematic 900 including: MDTU 160, and carbon monoxide (Co), nitrous oxide (NO), and Ozone (O3) sensors 180 communicating to MDTU 160.

FIG. 9 also shows IoT Gateway 910; LAN or LAN/WiFi connection 920A, 920B; routers 930A, 930B; cellular connections 940A, 940B; cellular base stations 950A, 950B; Internet I; IoT NS & AS; and client server 970.

FIG. 9 shows that MDTU may communicate with Internet and cellular network connected devices, and a IoT network controller, such as cloud controller 710, via different data communication paths and networks.

FIG. 10 shows schematic 1000 of an MDTU of FIG. 1 comprising power management and monitor, communication ports (RS232, RS485) to receive sensor data, and memory and an MTU to set messages according to communication specifications, and interfaces for communicating with another IoT node (B2B connector); a source of GPS signals (B2B connector); cellular networks (such as 3G and 4G, for example using mini PCIe) and WiFi transmitter (for example using mini PCIe).

FIG. 11 is a schematic 1100 of an agent (either a Network Edge agent or a Device Agent) communicating with an IoT network. FIG. 11 shows an application of an IoT device agent (or application) communicating via various wireless with different network nodes using MQTT and UDP protocols for the different communication paths, using environment independent gRPC for RPCs.

The invention claimed is:

1. A cloud controller comprising at least one processor and memory, configured to send management instructions at periodic or event-triggered intervals over packet-based wireless links with network nodes, and configured to determine parameters defining network links and to cause modification of at least one of the parameters, including at least one of radio access technology (RAT), allocated bandwidth, Quality of Service (QoS), scheduling priority, or data routes, and to distribute network-management tasks to network edge agents or device agents, the cloud controller comprising:

a memory storing:
(i) encryption or decryption keys corresponding to perception terminals, intermediate nodes, and data transmit units configured to carry sensor information;
(ii) values representing historical sensor measurements previously received from perception terminals; and
(iii) a mapping table and routing information used to route data, the mapping table including values representing (A) network status parameters comprising latency, bandwidth limits, and communication formats, and (B) control information comprising at least one of: power adjustment, transmission frequency, channel bandwidth, coding scheme, modulation, target block-error rate, required Quality of Service (QoS), target latency, or routing requirements for communication paths among perception terminals, intermediate nodes, edge or fog controllers, and the cloud controller; and a processor coupled to the memory, a packet buffering module, and a network interface, the processor executing instructions configured to:
(a) receive, via one or more intermediate nodes, a data transmit unit from a perception terminal, the data transmit unit including encrypted sensor values produced from sequential digital values;
(b) obtain session key information associated with the transmission of the data transmit unit using stored public-key information;
(c) decrypt the encrypted sensor values using the obtained session key and, when indicated by associated key information, one or more further keys to recover original sensor values;
(d) analyze the recovered sensor values to:
compute a first or second time derivative of the sensor values;
correlate values received from a plurality of perception terminals; or detect a deviation from historical sensor values stored in the memory; and
(e) transmit a control instruction to modify routing requirements or to modify configuration of a perception terminal, the control instruction comprising at least one of:
(i) a change to routing requirements;
(ii) a bandwidth or data-rate change associated with sensor packets;
(iii) a change to a sampling rate, data precision, or a frequency of transmission of a transceiver;
(iv) a change to a coding scheme, modulation, or channel bandwidth of the transceiver; or
(v) an assignment of priority for routing or buffering of sensor packets; and
(f) update a network status matrix including values representing spectral efficiency, resource-utilization rate, or real-time latency.

2. The cloud controller of claim 1, wherein the encryption key is generated or selected based on at least one of a transmission path or a transmission time.

3. The cloud controller of claim 1, wherein recovering the original sensor values comprises sequentially reversing encryption applied at one or more intermediate nodes.

4. The cloud controller of claim 1, wherein decrypting the encrypted sensor values comprises sequentially decrypting a transport-layer encrypted message and decrypting a device-layer encrypted payload contained within the message.

5. The cloud controller of claim 1, wherein the control instruction assigns a higher routing or buffering priority to data transmit units associated with an abnormal condition.

6. The cloud controller of claim 1, wherein the control instruction comprises changing a radio access technology (RAT) used by a perception terminal.

7. A multimode data transmit unit (MDTU) implemented in a sensor device, gateway, edge device, fog device, cloud-controlled device, or other networked computing device and configured to receive sensor data, process the data, and form data transmit units for communication over multiple communication modes, comprising:

a transceiver comprising at least one antenna, at least one mixer, an analog-to-digital converter (ADC), and a digital-to-analog converter (DAC), the transceiver comprising mixers, filters, amplifiers, modulators, and demodulators controlled by firmware or software to generate and process radio signals over a plurality of different wired or wireless communication modes, including packet-based wireless protocols; a memory storing routing tables and protocol information for forming data transmit units, values representing sensor identification, sensor location, network-timing information, and at least one hash function or at least one encryption algorithm; a processor configured by firmware and coupled to the transceiver to:
(a) receive sensor data or data transmit units via wired or wireless communication signals processed by the mixers, filters, amplifiers, modulators, and demodulators, and read the received data;
(b) digitally encode sensor values into sequential digital values and form data transmit units according to an encoding rule stored in the memory or received from a network node;
(c) detect an abnormal condition from the sensor data by performing time-based signal analysis comprising computing a first or second derivative of the digitized sensor values, or correlating sensor values received from multiple sensors; or by determining values outside a range, the range stored in a memory and associated with communication priority;

(d) execute communication prioritization in response to the abnormal condition by dynamically prioritizing communications associated with the abnormal condition; and (e) reconfigure the transceiver or sensors based on the prioritization by:

(i) issuing control instructions that modify at least one of transmission frequency, reception frequency, frequency band, sampling rate, data precision, data rate, transmit power, packet size, packet structure, modulation scheme, information coding scheme, receiver sensitivity, or communication interval; and (ii) encrypting or hashing message data using the stored hash function or encryption algorithm before transmission of the data transmit units.

8. The MDTU of claim 7, wherein the dynamically prioritizing communications comprises increasing priority of data transmitted from sensors having values outside the range.

9. The MDTU of claim 7, wherein the reconfiguring further comprises selecting a network node to perform communication processing tasks and transferring the processing to the selected node, the tasks comprising modulation, packet formation, or encryption based on network conditions or priority events.

10. The MDTU of claim 7, wherein the processor is configured to reduce or increase sensor sampling rate, data precision, or frequency of transmission based on network load, bandwidth usage, CPU usage of network nodes, or predicted congestion.

11. The MDTU of claim 7, wherein the processor is configured to dynamically determine communication parameters comprising at least one of bandwidth, data rate, latency, transmitted power, modulation scheme, coding scheme, receiver sensitivity, packet size, or packet structure based on channel conditions.

12. The MDTU of claim 7, wherein the processor determines a suitable incident control node by evaluating link latencies of paths between sensors providing abnormal values and nodes having available computing resources.

13. The MDTU of claim 7, wherein encryption of at least a portion of the data transmit units is based on a time value or a communication path.

14. The MDTU of claim 7, wherein the abnormal conditions comprise at least one of: a change in values from a motion sensor; a change in values from a door sensor or a window sensor; a change in values from a temperature sensor; a change in values indicating smoke; a change in values indicating fire; or a change in values from a humidity sensor, atmospheric gas sensor, chemical sensor, water-quality sensor, optical sensor, infrared sensor, level sensor, pressure sensor, acceleration sensor, gyroscopic sensor, or image sensor.

15. The MDTU of claim 7, wherein said abnormal condition includes identifying fire by correlating the sensor data regarding two or more of the following: temperature, humidity, atmospheric gas content, and smoke.

16. The MDTU of claim 7, wherein the processor increases data rate, sampling frequency, or reduces latency to provide responsive time feedback on the abnormal condition to automated response equipment.

* * * * *